(12) United States Patent
Stampfl et al.

(10) Patent No.: US 9,888,300 B2
(45) Date of Patent: Feb. 6, 2018

(54) POWER TOOL AND METHOD FOR WIRELESS COMMUNICATION

(71) Applicant: Milwaukee Electric Tool Corporation, Brookfield, WI (US)

(72) Inventors: Burtrom Lee Stampfl, Bristol, WI (US); Matthew J. Mergener, Mequon, WI (US); Alex Huber, Brookfield, WI (US); Paul Rossetto, Milwaukee, WI (US); Cole A. Conrad, Wauwatosa, WI (US); Stephen Matson, Milwaukee, WI (US); Scott R. Fischer, Menomonee Falls, WI (US); Mark A. Kubale, West Bend, WI (US); Christian Coulis, Sussex, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 15/668,488

(22) Filed: Aug. 3, 2017

(65) Prior Publication Data
US 2017/0359634 A1    Dec. 14, 2017

Related U.S. Application Data

(63) Continuation of application No. 15/146,535, filed on May 4, 2016, now Pat. No. 9,756,402.

(Continued)

(51) Int. Cl.
*H04Q 9/00*    (2006.01)
*B23Q 17/00*    (2006.01)
(Continued)

(52) U.S. Cl.
CPC .............. *H04Q 9/00* (2013.01); *B23Q 17/00* (2013.01); *B25F 5/00* (2013.01); *H04W 4/008* (2013.01);
(Continued)

(58) Field of Classification Search
CPC .............................. H04Q 2209/40; H04Q 9/00
(Continued)

(56) References Cited

U.S. PATENT DOCUMENTS

| 3,882,305 A | 5/1975 | Johnstone |
| 4,057,805 A | 11/1977 | Dowling |

(Continued)

FOREIGN PATENT DOCUMENTS

| CA | 2283552 | 3/2001 |
| DE | 3803357 | 8/1989 |

(Continued)

OTHER PUBLICATIONS

Bosch Media Service "Power Tools" Bosch Press Release, Mar. 3, 2016 (3 pages).
(Continued)

*Primary Examiner* — Keith Ferguson
(74) *Attorney, Agent, or Firm* — Michael Best & Friedrich LLP

(57) ABSTRACT

A power tool having multiple wireless communication states and a method of wirelessly communicating by a power tool. The power tool includes a motor, a battery pack interface that selectively receives a battery pack, a backup power source, and a wireless communication controller coupled to the backup power source and the battery pack interface. The wireless communication controller operates in a connectable state when coupled to a battery pack and transmits tool operational data to the external device and receives tool configuration data from the external device. The wireless communication controller operates in an advertisement state when the wireless communication controller is coupled to and powered by the backup power source. In the advertisement state, the wireless communication controller is configured to transmit the unique tool identifier. The external (Continued)

device may also display an indication of the communication state of the power tool.

21 Claims, 23 Drawing Sheets

Related U.S. Application Data

(60) Provisional application No. 62/190,295, filed on Jul. 9, 2015, provisional application No. 62/156,856, filed on May 4, 2015.

(51) Int. Cl.
    H04W 48/18    (2009.01)
    H04W 48/10    (2009.01)
    H04W 4/00     (2009.01)
    B25F 5/00     (2006.01)

(52) U.S. Cl.
    CPC .......... *H04W 48/10* (2013.01); *H04W 48/18* (2013.01); *H04Q 2209/40* (2013.01)

(58) Field of Classification Search
    USPC ......... 455/507, 500, 517, 557, 550.1, 426.1, 455/426.2, 575.1, 90.1–90.3, 572, 573, 455/575.7, 422.1, 403, 445, 73; 320/13, 320/14, 134
    See application file for complete search history.

(56) References Cited

U.S. PATENT DOCUMENTS

| | | |
|---|---|---|
| 4,545,106 A | 10/1985 | Juengel |
| 4,725,943 A | 2/1988 | Kuriyama et al. |
| 4,854,786 A | 8/1989 | Alexander et al. |
| 5,047,752 A | 9/1991 | Schorn |
| 5,188,188 A | 2/1993 | Mars |
| 5,315,501 A | 5/1994 | Whitehouse |
| 5,592,396 A | 1/1997 | Tambini et al. |
| 5,903,462 A | 5/1999 | Wagner et al. |
| 5,942,975 A | 8/1999 | Sørensen |
| 6,005,189 A | 12/1999 | Anker |
| 6,005,489 A | 12/1999 | Siegle et al. |
| 6,055,484 A | 4/2000 | Lysaght |
| 6,123,241 A | 9/2000 | Walter et al. |
| 6,157,313 A | 12/2000 | Emmermann |
| 6,161,629 A | 12/2000 | Hohmann et al. |
| 6,225,906 B1 | 5/2001 | Shore |
| 6,279,668 B1 | 8/2001 | Mercer |
| 6,285,096 B1 | 9/2001 | Müller et al. |
| 6,285,860 B1 | 9/2001 | Szarka et al. |
| 6,349,266 B1 | 2/2002 | Lysaght et al. |
| 6,390,205 B2 | 5/2002 | Wallgren et al. |
| 6,405,598 B1 | 6/2002 | Bareggi |
| 6,469,615 B1 | 10/2002 | Kady et al. |
| 6,520,270 B2 | 2/2003 | Wissmach et al. |
| 6,522,949 B1 | 2/2003 | Ikeda et al. |
| 6,547,014 B2 | 4/2003 | McCallops et al. |
| 6,607,041 B2 | 8/2003 | Suzuki et al. |
| 6,668,212 B2 | 12/2003 | Colangelo et al. |
| 6,675,196 B1 | 1/2004 | Kronz |
| 6,768,994 B1 | 1/2004 | Howard et al. |
| 6,784,801 B2 | 8/2004 | Watanabe et al. |
| 6,845,279 B1 | 1/2005 | Gilmore et al. |
| 6,848,516 B2 | 2/2005 | Giardina |
| 6,872,121 B2 | 3/2005 | Wiener et al. |
| 6,876,173 B2 | 4/2005 | Mastaler et al. |
| 6,913,087 B1 | 7/2005 | Brotto et al. |
| 6,923,285 B1 | 8/2005 | Rossow et al. |
| 6,938,689 B2 | 9/2005 | Farrant et al. |
| 6,954,048 B2 | 10/2005 | Cho |
| 6,981,311 B2 | 1/2006 | Seith et al. |
| 6,992,585 B2 | 1/2006 | Saleh et al. |
| 7,022,924 B2 | 4/2006 | Patton |
| 7,034,711 B2 | 4/2006 | Sakatani et al. |
| 7,035,710 B2 | 4/2006 | Balling |
| 7,035,898 B1 | 4/2006 | Baker |
| 7,036,703 B2 | 5/2006 | Grazioli et al. |
| 7,050,907 B1 | 5/2006 | Janky et al. |
| 7,064,502 B2 | 6/2006 | Garcia et al. |
| 7,079,813 B2 | 7/2006 | Szarka et al. |
| 7,102,303 B2 | 9/2006 | Brotto et al. |
| 7,116,969 B2 | 10/2006 | Park |
| 7,123,149 B2 | 10/2006 | Nowak et al. |
| 7,211,972 B2 | 5/2007 | Garcia et al. |
| 7,218,227 B2 | 5/2007 | Davis et al. |
| 7,228,917 B2 | 6/2007 | Davis et al. |
| 7,237,990 B2 | 7/2007 | Deng |
| 7,253,541 B2 | 8/2007 | Kovarik et al. |
| 7,253,736 B2 | 8/2007 | Tethrake et al. |
| 7,256,699 B2 | 8/2007 | Tethrake et al. |
| 7,282,818 B2 | 10/2007 | Kovarik |
| 7,298,240 B2 | 11/2007 | Lamar |
| 7,328,086 B2 | 2/2008 | Perry et al. |
| 7,328,757 B2 | 2/2008 | Davies |
| 7,330,129 B2 | 2/2008 | Crowell et al. |
| 7,336,181 B2 | 2/2008 | Nowak et al. |
| 7,339,477 B2 | 3/2008 | Puzio et al. |
| 7,343,764 B2 | 3/2008 | Solfronk |
| 7,346,406 B2 | 3/2008 | Brotto et al. |
| 7,346,422 B2 | 3/2008 | Tsuchiya et al. |
| 7,359,762 B2 | 4/2008 | Etter et al. |
| 7,382,272 B2 | 6/2008 | Feight |
| 7,383,882 B2 | 6/2008 | Lerche et al. |
| 7,394,347 B2 | 7/2008 | Kady et al. |
| 7,398,834 B2 | 7/2008 | Jung et al. |
| 7,437,204 B2 | 10/2008 | Lev-Ami et al. |
| 7,443,137 B2 | 10/2008 | Scott et al. |
| 7,464,769 B2 | 12/2008 | Nakazawa et al. |
| 7,521,892 B2 | 4/2009 | Funabashi et al. |
| 7,608,790 B2 | 10/2009 | Patton |
| 7,613,590 B2 | 11/2009 | Brown |
| 7,646,155 B2 | 1/2010 | Woods et al. |
| RE41,160 E | 3/2010 | Gilmore et al. |
| RE41,185 E | 3/2010 | Gilmore et al. |
| 7,688,028 B2 | 3/2010 | Phillips et al. |
| 7,690,569 B2 | 4/2010 | Swanson et al. |
| 7,750,811 B2 | 7/2010 | Puzio et al. |
| 7,772,850 B2 | 8/2010 | Bertness |
| 7,784,104 B2 | 8/2010 | Innami et al. |
| 7,787,981 B2 | 8/2010 | Austin et al. |
| 7,809,495 B2 | 10/2010 | Leufen |
| 7,817,062 B1 | 10/2010 | Li et al. |
| 7,827,718 B2 | 11/2010 | Luebkert et al. |
| 7,834,566 B2 | 11/2010 | Woods et al. |
| 7,837,694 B2 | 11/2010 | Tethrake et al. |
| 7,850,071 B2 | 12/2010 | Sakamoto et al. |
| 7,868,591 B2 | 1/2011 | Phillips et al. |
| 7,887,559 B2 | 2/2011 | Deng et al. |
| 7,898,403 B2 | 3/2011 | Ritter et al. |
| 7,900,524 B2 | 3/2011 | Calloway et al. |
| 7,911,379 B2 | 3/2011 | Cameron |
| 7,928,673 B2 | 4/2011 | Woods et al. |
| 7,928,845 B1 | 4/2011 | LaRosa |
| 7,931,096 B2 | 4/2011 | Saha |
| 7,942,084 B2 | 5/2011 | Wilson, Jr. et al. |
| 7,942,211 B2 | 5/2011 | Scrimshaw et al. |
| 7,953,965 B2 | 5/2011 | Qin et al. |
| 7,982,624 B2 | 7/2011 | Richter et al. |
| 7,990,109 B2 | 8/2011 | White et al. |
| 8,004,397 B2 | 8/2011 | Forrest et al. |
| 8,004,664 B2 | 8/2011 | Etter et al. |
| 8,005,647 B2 | 8/2011 | Armstrong et al. |
| 8,035,487 B2 | 10/2011 | Malackowski |
| 8,044,796 B1 | 10/2011 | Carr, Sr. |
| 8,049,636 B2 | 11/2011 | Buckingham et al. |
| 8,066,533 B2 | 11/2011 | Tomita et al. |
| 8,129,955 B2 | 3/2012 | White et al. |
| 8,154,885 B2 | 4/2012 | Anderson |
| 8,157,826 B2 | 4/2012 | Deng et al. |
| 8,161,613 B2 | 4/2012 | Schuele et al. |
| 8,169,298 B2 | 5/2012 | Wiesner et al. |
| 8,171,828 B2 | 5/2012 | Duvan et al. |

(56) References Cited

U.S. PATENT DOCUMENTS

| | | |
|---|---|---|
| 8,200,354 B2 | 6/2012 | Freeman et al. |
| 8,210,273 B2 | 7/2012 | Suzuki et al. |
| 8,210,275 B2 | 7/2012 | Suzuki et al. |
| 8,255,358 B2 | 8/2012 | Ballew et al. |
| 8,260,452 B2 | 9/2012 | Austin et al. |
| 8,264,374 B2 | 9/2012 | Obatake et al. |
| 8,281,871 B2 | 10/2012 | Cutler et al. |
| 8,289,132 B2 | 10/2012 | Kady et al. |
| 8,294,424 B2 | 10/2012 | Bucur |
| 8,305,042 B2 | 11/2012 | Wirnitzer et al. |
| 8,306,836 B2 | 11/2012 | Nichols et al. |
| 8,310,206 B2 | 11/2012 | Bucur |
| 8,330,426 B2 | 12/2012 | Suzuki et al. |
| 8,344,879 B2 | 1/2013 | Harmon et al. |
| 8,351,982 B2 | 1/2013 | Rofougaran |
| 8,354,183 B2 | 1/2013 | Konuma et al. |
| 8,406,697 B2 | 3/2013 | Arimura et al. |
| 8,412,179 B2 | 4/2013 | Gerold et al. |
| 8,438,955 B2 | 5/2013 | Wilson, Jr. et al. |
| 8,454,613 B2 | 6/2013 | Tethrake et al. |
| 8,464,808 B2 | 6/2013 | Leü et al. |
| 8,485,049 B2 | 7/2013 | Yokoyama et al. |
| 8,500,769 B2 | 8/2013 | Deng |
| 8,535,342 B2 | 9/2013 | Malackowski et al. |
| 8,542,090 B2 | 9/2013 | Calvet et al. |
| 8,555,755 B2 | 10/2013 | Cattaneo |
| 8,576,095 B2 | 11/2013 | Harmon et al. |
| 8,611,250 B2 | 12/2013 | Chen et al. |
| 8,624,721 B2 | 1/2014 | Barker, Jr. et al. |
| 8,630,729 B2 | 1/2014 | Freeman et al. |
| 8,645,176 B2 | 2/2014 | Walton et al. |
| 8,657,482 B2 | 2/2014 | Malackowski et al. |
| 8,666,936 B2 | 3/2014 | Wallace |
| 8,686,831 B2 | 4/2014 | Green et al. |
| 8,776,644 B2 | 7/2014 | Harper et al. |
| 8,818,617 B2 | 8/2014 | Miller et al. |
| 8,823,322 B2 | 9/2014 | Noda et al. |
| 8,870,078 B2 | 10/2014 | Webb et al. |
| 8,928,463 B2 | 1/2015 | Landau et al. |
| 8,938,315 B2 | 1/2015 | Freeman et al. |
| 8,954,222 B2 | 2/2015 | Costantino |
| 8,954,227 B2 | 2/2015 | Bertosa et al. |
| 8,963,681 B2 | 2/2015 | Kady et al. |
| 8,965,841 B2 | 2/2015 | Wallace |
| 8,981,680 B2 | 3/2015 | Suda et al. |
| 8,996,237 B2 | 3/2015 | Bertosa et al. |
| 9,002,572 B2 | 4/2015 | Lipscomb et al. |
| 9,031,585 B2 | 5/2015 | Kahle et al. |
| 9,063,558 B2 | 6/2015 | Fukumura |
| 9,089,952 B2 | 7/2015 | Gatling et al. |
| 9,094,793 B2 | 7/2015 | Kusakari et al. |
| 9,111,234 B2 | 8/2015 | Wallace et al. |
| 9,126,317 B2 | 9/2015 | Lawton et al. |
| 9,194,917 B2 | 11/2015 | Brochhaus |
| 9,216,505 B2 | 12/2015 | Rejman et al. |
| 9,232,614 B2 | 1/2016 | Hiroi |
| 9,233,457 B2 | 1/2016 | Wanek et al. |
| 9,256,988 B2 | 2/2016 | Wenger et al. |
| 9,257,865 B2 | 2/2016 | Hiuggins et al. |
| 9,281,770 B2 | 3/2016 | Wood et al. |
| 9,458,996 B2 | 10/2016 | Francis et al. |
| 9,466,198 B2 | 10/2016 | Burch et al. |
| 9,537,335 B2 | 1/2017 | Furui et al. |
| 2001/0035729 A1 | 11/2001 | Graiger et al. |
| 2001/0052416 A1 | 12/2001 | Wissmach et al. |
| 2002/0033267 A1 | 3/2002 | Schweizer et al. |
| 2002/0050364 A1 | 5/2002 | Suzuki et al. |
| 2002/0081975 A1 | 6/2002 | Szarka et al. |
| 2002/0195883 A1 | 6/2002 | Szarka et al. |
| 2003/0043016 A1 | 10/2002 | Maloney |
| 2003/0093103 A1 | 12/2002 | Lazzaro |
| 2003/0121677 A1 | 3/2003 | Kady et al. |
| 2003/0188441 A1 | 5/2003 | Malackiwski et al. |
| 2004/0182587 A1 | 7/2003 | Watanabe et al. |
| 2005/0035659 A1 | 10/2003 | Patton |
| 2006/0009879 A1 | 2/2005 | Hahn et al. |
| 2005/0200485 A1 | 9/2005 | May et al. |
| 2006/0076385 A1 | 9/2005 | Connolly et al. |
| 2006/0155582 A1 | 1/2006 | Lynch et al. |
| 2006/0087283 A1 | 4/2006 | Phillips et al. |
| 2007/0252675 A1 | 4/2006 | Etter et al. |
| 2002/0153418 A1 | 7/2006 | Brown |
| 2008/0084334 A1 | 11/2007 | Lamar |
| 2008/0086320 A1 | 4/2008 | Ballew |
| 2008/0086323 A1 | 4/2008 | Ballew et al. |
| 2008/0086349 A1 | 4/2008 | Petrie et al. |
| 2008/0086427 A1 | 4/2008 | Petrie |
| 2008/0086428 A1 | 4/2008 | Wallace |
| 2008/0086685 A1 | 4/2008 | Janky et al. |
| 2008/0177267 A1 | 7/2008 | Sands et al. |
| 2008/0252446 A1 | 10/2008 | Dammertz |
| 2009/0250364 A1 | 10/2009 | Gerold et al. |
| 2009/0251330 A1 | 10/2009 | Gerold et al. |
| 2009/0251880 A1 | 10/2009 | Anderson |
| 2009/0273436 A1 | 11/2009 | Gluck et al. |
| 2010/0096151 A1 | 4/2010 | Östling |
| 2010/0116519 A1 | 5/2010 | Gareis |
| 2010/0154599 A1 | 6/2010 | Gareis |
| 2010/0176766 A1 | 7/2010 | Brandner et al. |
| 2010/0216415 A1 | 8/2010 | Arimura et al. |
| 2010/0282482 A1 | 11/2010 | Austin et al. |
| 2011/0056716 A1 | 3/2011 | Jönsson et al. |
| 2011/0067895 A1 | 3/2011 | Nobe et al. |
| 2011/0073343 A1 | 3/2011 | Sawano et al. |
| 2011/0121782 A1 | 5/2011 | Marsh et al. |
| 2011/0162858 A1 | 7/2011 | Coste |
| 2011/0309931 A1 | 12/2011 | Rose |
| 2012/0111589 A1 | 5/2012 | Schmidt et al. |
| 2012/0167721 A1 | 7/2012 | Fluhrer |
| 2012/0168189 A1 | 7/2012 | Eckert |
| 2012/0267134 A1 | 10/2012 | Matthias et al. |
| 2012/0292070 A1 | 11/2012 | Ito et al. |
| 2012/0302101 A1 | 11/2012 | Brotto et al. |
| 2012/0306291 A1 | 12/2012 | Wirnitzer |
| 2012/0325507 A1 | 12/2012 | Fluhrer et al. |
| 2013/0024245 A1 | 1/2013 | Nichols et al. |
| 2013/0071815 A1 | 3/2013 | Hudson et al. |
| 2013/0109375 A1* | 5/2013 | Zeiler .................. H04W 4/028 455/426.1 |
| 2013/0118767 A1 | 5/2013 | Cannaliato et al. |
| 2013/0133907 A1 | 5/2013 | Chen et al. |
| 2013/0138465 A1 | 5/2013 | Kahle et al. |
| 2013/0138606 A1 | 5/2013 | Kahle et al. |
| 2013/0153250 A1 | 6/2013 | Eckert |
| 2013/0187587 A1 | 7/2013 | Knight et al. |
| 2013/0188058 A1 | 7/2013 | Nguyen et al. |
| 2013/0191417 A1 | 7/2013 | Petrie et al. |
| 2013/0200159 A1 | 8/2013 | Webb et al. |
| 2013/0204753 A1 | 8/2013 | Wallace |
| 2013/0255980 A1 | 10/2013 | Linehan et al. |
| 2013/0296910 A1 | 11/2013 | Deng |
| 2013/0304545 A1 | 11/2013 | Ballew et al. |
| 2014/0006295 A1 | 1/2014 | Zeiler et al. |
| 2014/0008093 A1 | 1/2014 | Patel et al. |
| 2014/0015389 A1 | 1/2014 | Vatterott et al. |
| 2014/0025834 A1 | 1/2014 | Mergener |
| 2014/0031831 A1 | 1/2014 | Malackowski et al. |
| 2014/0069672 A1 | 3/2014 | Mashiko et al. |
| 2014/0070924 A1 | 3/2014 | Wenger et al. |
| 2014/0107853 A1 | 4/2014 | Ashinghurst et al. |
| 2014/0122143 A1 | 5/2014 | Fletcher et al. |
| 2014/0139344 A1 | 5/2014 | Chudy |
| 2014/0151079 A1 | 6/2014 | Furui et al. |
| 2014/0158389 A1 | 6/2014 | Ito et al. |
| 2014/0159640 A1 | 6/2014 | Yoshikawa et al. |
| 2014/0159662 A1 | 6/2014 | Furui et al. |
| 2014/0159919 A1 | 6/2014 | Furui et al. |
| 2014/0159920 A1 | 6/2014 | Furui et al. |
| 2014/0180464 A1 | 6/2014 | Koerber |
| 2014/0184397 A1 | 7/2014 | Volpert |
| 2014/0240125 A1 | 8/2014 | Burch et al. |
| 2014/0266024 A1 | 9/2014 | Chinnadurai et al. |
| 2014/0284070 A1 | 9/2014 | Ng et al. |
| 2014/0292245 A1 | 10/2014 | Suzuki et al. |

(56) References Cited

U.S. PATENT DOCUMENTS

| | | |
|---|---|---|
| 2014/0324194 A1 | 10/2014 | Larsson et al. |
| 2014/0331830 A1 | 11/2014 | King et al. |
| 2014/0334270 A1 | 11/2014 | Kusakawa |
| 2014/0336810 A1 | 11/2014 | Li et al. |
| 2014/0336955 A1 | 11/2014 | Li et al. |
| 2014/0350716 A1 | 11/2014 | Fly et al. |
| 2014/0365259 A1 | 12/2014 | Delplace et al. |
| 2014/0367134 A1 | 12/2014 | Phillips et al. |
| 2014/0379136 A1 | 12/2014 | Schlegel et al. |
| 2015/0000944 A1 | 1/2015 | Duesselberg et al. |
| 2015/0002089 A1 | 1/2015 | Rejman et al. |
| 2015/0007541 A1 | 1/2015 | Albinger et al. |
| 2015/0042247 A1 | 2/2015 | Kusakawa |
| 2015/0054627 A1 | 2/2015 | Landau et al. |
| 2015/0127205 A1 | 5/2015 | Brochhaus |
| 2015/0135306 A1 | 5/2015 | Winkler et al. |
| 2015/0162646 A1 | 6/2015 | Kawase et al. |
| 2015/0179036 A1 | 6/2015 | Heine et al. |
| 2015/0191096 A1 | 7/2015 | Becker et al. |
| 2015/0219257 A1 | 8/2015 | Harper et al. |
| 2015/0277428 A1 | 10/2015 | Dackefjord |
| 2015/0286209 A1 | 10/2015 | Kreuzer et al. |
| 2015/0340921 A1 | 11/2015 | Suda et al. |
| 2016/0088482 A1 | 3/2016 | Zeiler et al. |
| 2017/0008159 A1 | 1/2017 | Boeck et al. |

FOREIGN PATENT DOCUMENTS

| | | |
|---|---|---|
| DE | 4429206 | 3/1996 |
| DE | 10026263 | 3/2001 |
| DE | 10029132 | 1/2002 |
| DE | 10029138 | 1/2002 |
| DE | 20300219 | 3/2003 |
| DE | 10233504 | 2/2004 |
| DE | 10238710 | 3/2004 |
| DE | 10309703 | 9/2004 |
| DE | 202006014606 | 1/2007 |
| DE | 202007005202 | 6/2007 |
| EP | 0674973 | 10/1995 |
| EP | 1455319 | 9/2004 |
| EP | 2147750 | 1/2010 |
| GB | 2435001 | 8/2007 |
| JP | H071284 | 1/1995 |
| JP | 2000176850 | 6/2000 |
| JP | 2004072563 | 3/2004 |
| JP | 2006123080 | 5/2006 |
| WO | WO 97023986 | 7/1997 |
| WO | WO 0007767 | 2/2000 |
| WO | WO 02030624 | 4/2002 |
| WO | WO 2007090258 | 8/2007 |
| WO | WO 2012035815 | 3/2012 |
| WO | WO 2012035854 | 3/2012 |
| WO | WO 2013116303 | 8/2013 |

OTHER PUBLICATIONS

International Search Report and Written Opinion for Application No. PCT/US2016/030765 dated Sep. 19, 2016 (24 pages).

\* cited by examiner

POWER TOOL AND METHOD FOR WIRELESS COMMUNICATION

RELATED APPLICATIONS

This application is a continuation of U.S. patent application Ser. No. 15/146,535, filed May 4, 2016, which claims priority to U.S. Provisional Patent Application No. 62/190,295, filed on Jul. 9, 2015, and U.S. Provisional Patent Application No. 62/156,856, filed on May 4, 2015, the entire contents of which are hereby incorporated by reference.

FIELD OF THE INVENTION

The present invention relates to power tools that communicate wirelessly with an external device.

SUMMARY

In one embodiment, a power tool is provided having multiple wireless communication states. The power tool includes a motor, a battery pack interface that selectively receives a battery pack, and a backup power source. The power tool further includes a wireless communication controller coupled to the backup power source and the battery pack interface. The wireless communication controller includes a wireless transceiver, a processor, and a unique tool identifier. Additionally, the wireless communication controller is configured to operate in a connectable state when the wireless communication controller is coupled to and powered by the battery pack. In the connectable state, the wireless communication controller is configured to form a wireless communication link with an external device and to one or more of transmit tool operational data to the external device and receive tool configuration data from the external device. The wireless communication controller is further configured to operate in an advertisement state when the wireless communication controller is coupled to and powered by the backup power source. In the advertisement state, the wireless communication controller is configured to transmit an advertisement message including the unique tool identifier.

In another embodiment, a method of wirelessly communicating by a power tool is provided. The method includes, the method determining, by a wireless communication controller of the power tool, that the battery pack interface is connected to a battery pack. The wireless communication controller enters a connectable state for wireless communication based on determining that the battery pack interface is connected to the battery pack. The method further includes forming a wireless communication link with an external device in the connectable state, and communicating, over the wireless communication link, to one or more of transmit tool operational data and receive tool configuration data from the external device. The method also includes determining, by the wireless communication controller, that a battery pack interface is disconnected from the battery pack. The wireless communication controller enters an advertisement state for wireless communication based on determining that the battery pack interface is disconnected from the battery pack. The wireless communication controller further transmits an advertisement message including a unique tool identifier of the power tool when in the advertisement state.

In another embodiment, a power tool having multiple wireless communication states is provided. The power tool includes a motor, a battery pack interface that selectively receives a battery pack and a backup power source. The power tool further includes a real-time clock, a wireless communication controller, and a controller. The real-time clock is coupled to the backup power source and configured to maintain a current time. The wireless communication controller is coupled to the backup power source and the battery pack interface; includes a wireless transceiver, a processor, and a unique tool identifier; and is configured to receive a lock out time. The controller is configured to receive the lock out time from the wireless communication controller and the current time. The controller is further configured to lock the power tool upon determining that the current time exceeds the lock out time.

In one embodiment, the invention provides a cordless power tool including a drive device, a handle portion, a motor portion (e.g., an upper main body of a housing), a backup battery, and a real time clock. The handle portion of the power tool includes a foot of the power tool. The power tool is configured to receive a removable battery pack. The backup battery powers the real time clock even when the removable battery pack is detached from the tool.

In some embodiments, the backup battery is positioned adjacent a Bluetooth module, and the Bluetooth module is positioned at the foot of the tool.

In some embodiments, the backup battery is positioned within a pocket inside the power tool and is easily accessible for backup battery replacement when applicable. The pocket does not interfere with the attachable power tool battery pack and does not interfere with additional accessories (e.g., belt clip tool holder and bit holder). The pocket is positioned in an area of the power tool such that the backup battery is not damaged when the tool is dropped and impacts onto a hard surface.

In another embodiment, the invention provides a method for identifying when different power tools are within a particular area (e.g., a general vicinity), and what tools, specifically, are present. The method further includes identifying to the user whether the power tool is in a connectable state or in an inaccessible state based on whether a battery pack is currently attached to the power tool.

In one embodiment, the invention provides a power tool including a drive device for performing a task, a motor coupled to the drive device and configured to drive the drive device, a wireless communication controller having a real-time clock, a backup power source, a receiving portion configured to receive a main power source, and a controller. The controller is coupled to the motor, the wireless communication controller, and the main power source. The controller is configured to control the operation of the motor.

Other aspects of the invention will become apparent by consideration of the detailed description and accompanying drawings.

DETAILED DESCRIPTION

Figure 1:
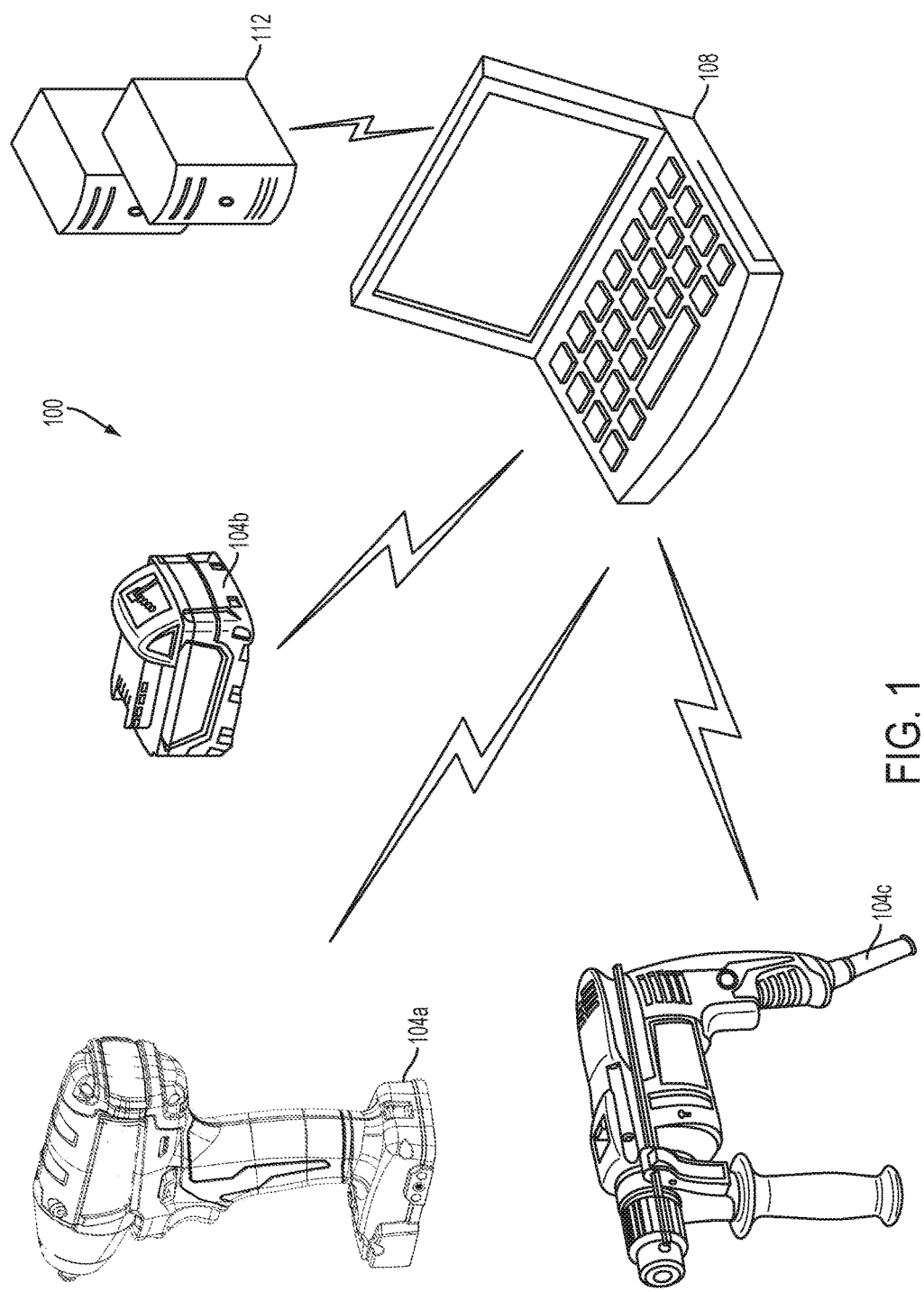
FIG. 1 illustrates a communication system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates a communication system 100. The communication system 100 includes power tool devices 104a, 104b, and 104c, each generically referred to as the power tool 104, and an external device 108. The power tool 104 and the external device 108 can communicate wirelessly while they are within a communication range of each other. The power tool 104 may communicate power tool status, power tool operation statistics, power tool identification, stored power tool usage information, power tool maintenance data, and the like. Therefore, using the external device 108, a user can access stored power tool usage or power tool maintenance data. With this tool data, a user can determine how the power tool 104 has been used, whether maintenance is recommended or has been performed in the past, and identify malfunctioning components or other reasons for certain performance issues. The external device 108 can also transmit data to the power tool 104 for power tool configuration, firmware updates, or to send commands (e.g., turn on a work light, lock power tool 104, and the like). The external device 108 also allows a user to set operational parameters, safety parameters, select tool modes, and the like for the power tool 104.

The external device 108 may be, for example, a laptop computer, a tablet computer, a smartphone, a cellphone, or another electronic device capable of communicating wirelessly with the power tool 104 and providing a user interface. The external device 108 provides the user interface and allows a user to access and interact with tool information. The external device 108 can receive user inputs to determine operational parameters, enable or disable features, and the like. The user interface of the external device 108 provides an easy-to-use interface for the user to control and customize operation of the power tool 104.

Figure 2:
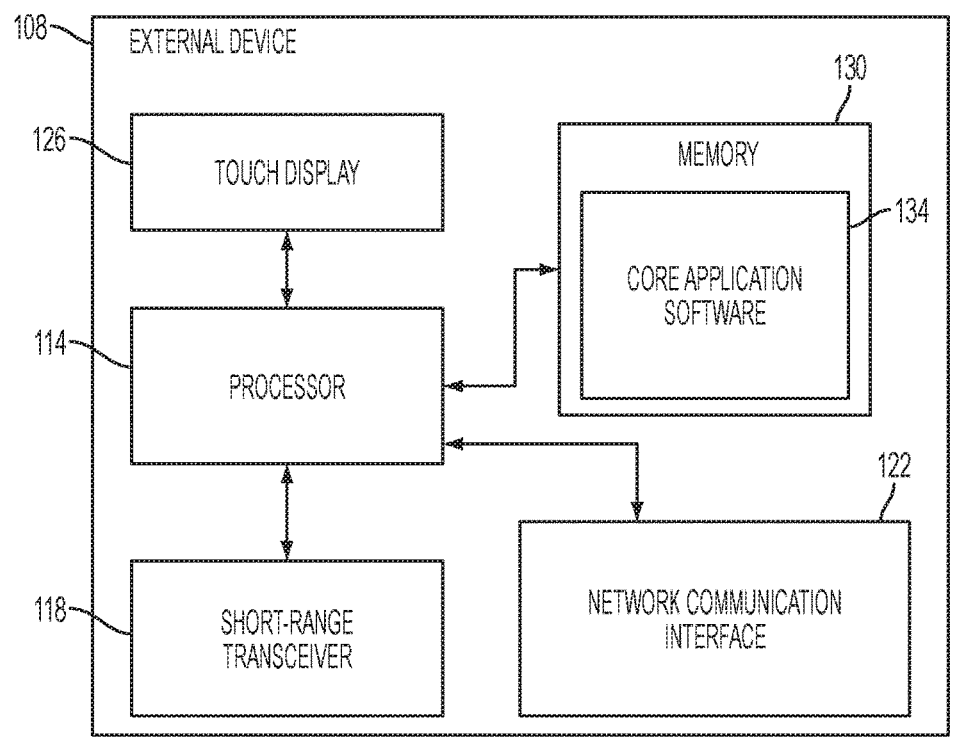
FIG. 2 illustrates an external device of the communication system.

As shown in FIG. 2, the external device 108 includes an external device processor 114, a short-range transceiver 118, a network communication interface 122, a touch display 126, and a memory 130. The external device processor 114 is coupled to the short-range transceiver 118, the network communication interface 122, the touch display 126, and the memory 130. The short-range transceiver 118, which may include or is coupled to an antenna (not shown), is configured to communicate with a compatible transceiver within the power tool 104. The short-range transceiver 118 can also communicate with other electronic devices. The network communication interface 122 communicates with a network to enable communication with the remote server 112. The network communication interface 122 may include circuitry that enables the external device 108 to communicate with the network. In some embodiments, the network may be an Internet network, a cellular network, another network, or a combination thereof.

The memory 130 of the external device 108 also stores core application software 134. The external device processor 114 accesses and executes the core application software 134 in memory 130 to launch a control application. After the external device 108 launches the control application, the external device 108 receives inputs from the user (e.g., via the touch display 126). In response to the inputs, the external device 108 communicates with the power tool 104 to update software in the power tool 104. Through these updates, a user is able to define the operation of the power tool 104. In some embodiments, the external device 108 also communicates with the remote server 112 to provide information regarding the operation of the power tool 104 and the like.

The external device 108 includes the short-range transceiver 118, which is compatible with a wireless communication interface or module of the power tool 104. The communication interface of the external device 108 may include a wireless communication controller (e.g., a Bluetooth® module), or a similar component. The external device 108, therefore, grants the user access to data related to the power tool 104, and provides a user interface such that the user can interact with the controller of the power tool 104.

In addition, the external device 108 can also share the information obtained from the power tool 104 with the remote server 112. The remote server 112 may be used to store the data obtained from the external device 108, provide additional functionality and services to the user, or a combination thereof. In one embodiment, storing the information on the remote server 112 allows a user to access the information from a plurality of different devices and locations (e.g., a remotely located desktop computer). In another embodiment, the remote server 112 may collect information from various users regarding their power tool devices and provide statistics or statistical measures to the user based on information obtained from the different power tools. For example, the remote server 112 may provide statistics regarding the experienced efficiency of the power tool 104, typical usage of the power tool 104, and other relevant characteristics and/or measures of the power tool 104. In some embodiments, the power tool 104 may be configured to communicate directly with the server 112 through an additional wireless interface or with the same wireless interface that the power tool 104 uses to communicate with the external device 108.

The power tool 104 is configured to perform one or more specific tasks (e.g., drilling, cutting, fastening, pressing, lubricant application, sanding, heating, grinding, bending, forming, impacting, polishing, lighting, etc.). For example, an impact wrench is associated with the task of generating a rotational output (e.g., to drive a bit), while a reciprocating saw is associated with the task of generating a reciprocating output motion (e.g., for pushing and pulling a saw blade). The task(s) associated with a particular tool may also be referred to as the primary function(s) of the tool.

Figure 3:
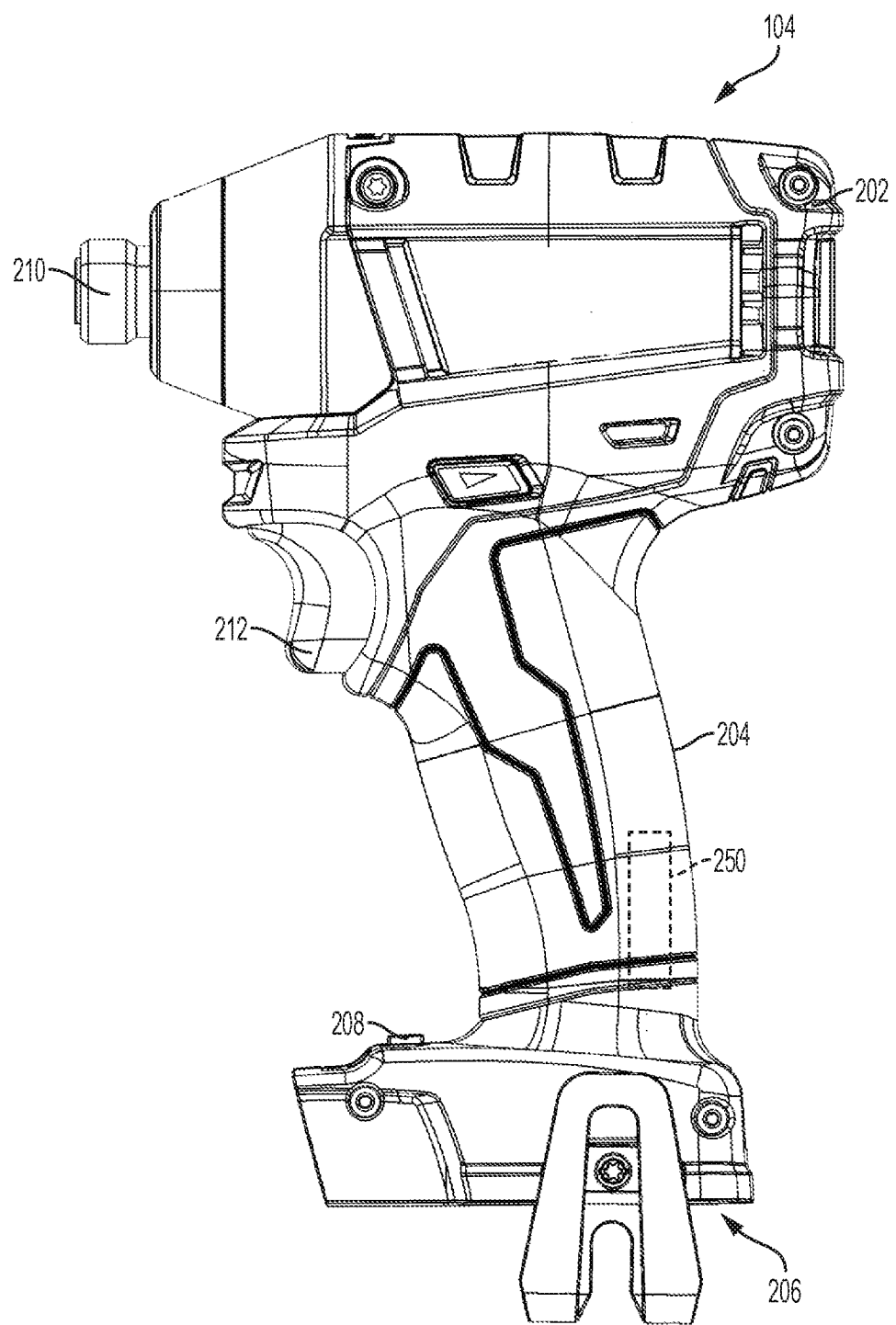
FIG. 3 illustrates a power tool of the communication system.
Figure 4:
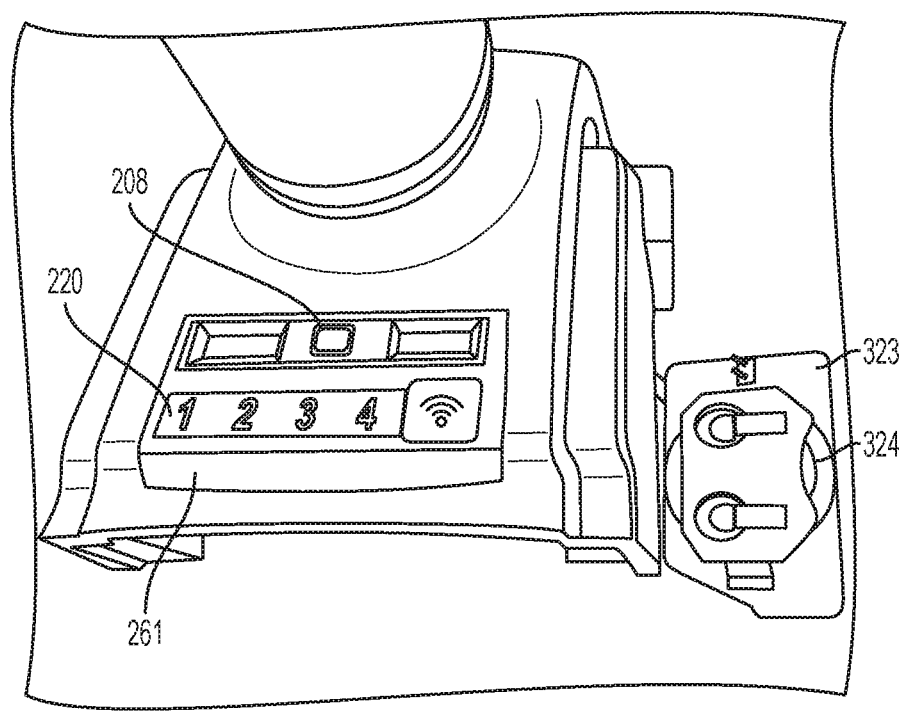
FIG. 4 illustrates selection switches of the power tool.

Although the power tool 104 illustrated and described herein is an impact wrench, embodiments of the invention similarly apply to and can be used in conjunction with a variety of power tools (e.g., a power drill, a hammer drill, a pipe cutter, a sander, a nailer, a grease gun, etc.). As shown in FIG. 3, the power tool 104 includes an upper main body 202, a handle 204, a battery pack receiving portion 206, selection switch 208, an output drive device or mechanism 210, and a trigger 212 (or other actuator). The housing of the power tool 104 (e.g., the main body 202 and the handle 204) are composed of a durable and light-weight plastic material. The drive device 210 is composed of a metal (e.g., steel). The drive device 210 on the power tool 104 is a socket. However, each power tool 104 may have a different drive device 210 specifically designed for the task associated with the power tool 104. For example, the drive device 210 for a power drill may include a bit driver, while the drive device 210 for a pipe cutter may include a blade. The selection switch 208 is configured to select the speed and/or torque mode for the power tool 104. For instance, different modes stored on the power tool 104 may have different speed or torque levels, and pressing the selection switch 208 cycles between the different modes of the power tool 104. For embodiments in which the power tool 104 is different than the impact wrench 104, the different modes may be related to settings for other parameters such as, for example, crimping pressures for crimpers. FIG. 4 illustrates a more detailed view of the selection switch 208.

Figure 5:
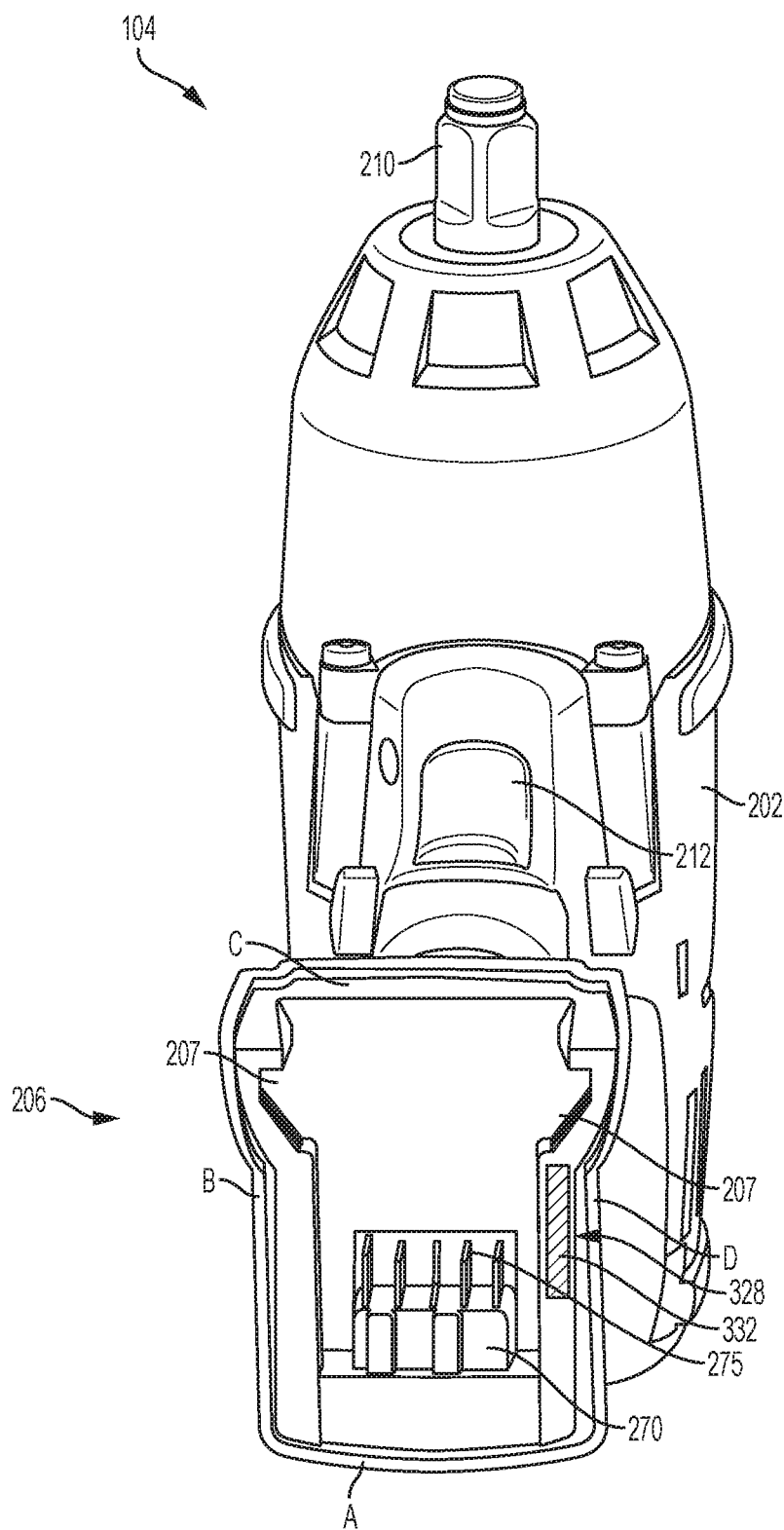
FIG. 5 illustrates a battery pack receiving portion of the power tool.
Figure 12A:
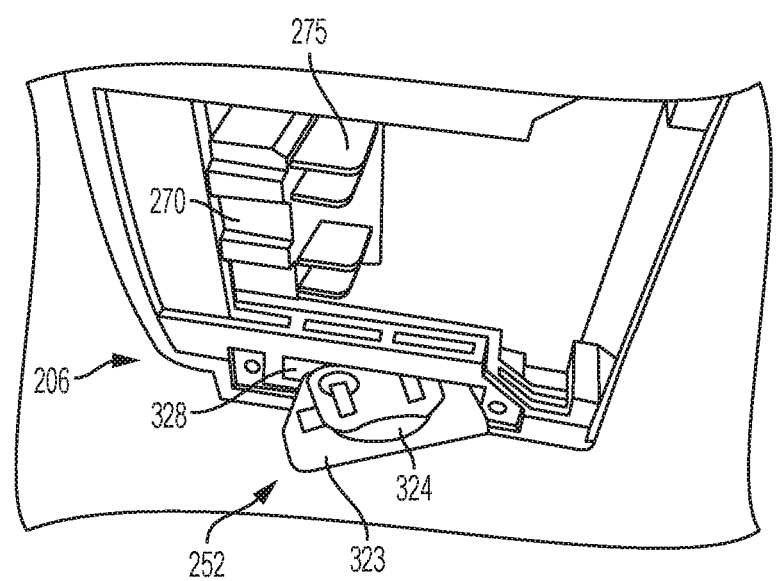
FIGS. 12A-E illustrate a backup power source of the power tool.
Figure 12B:
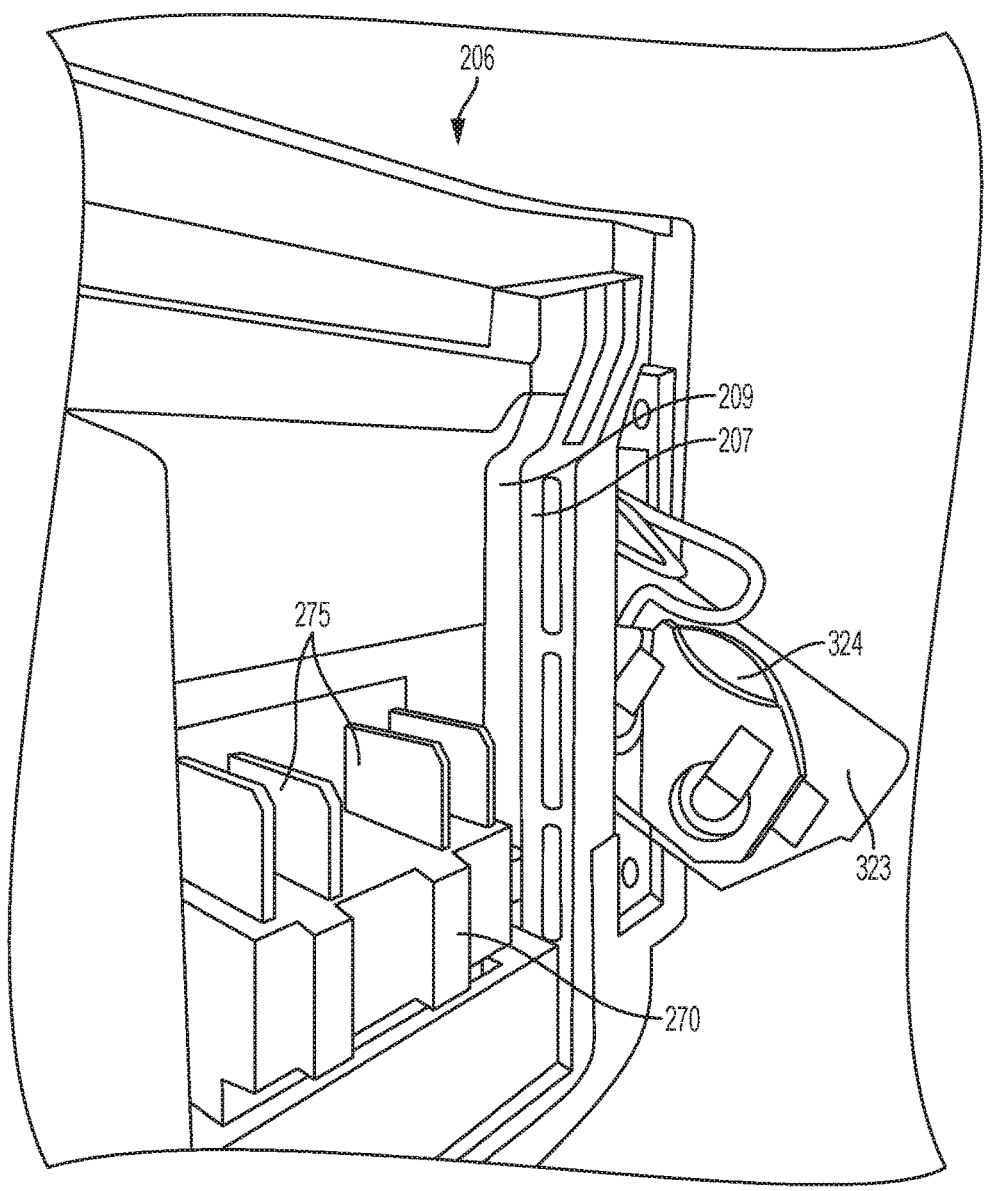
Figure 12C:
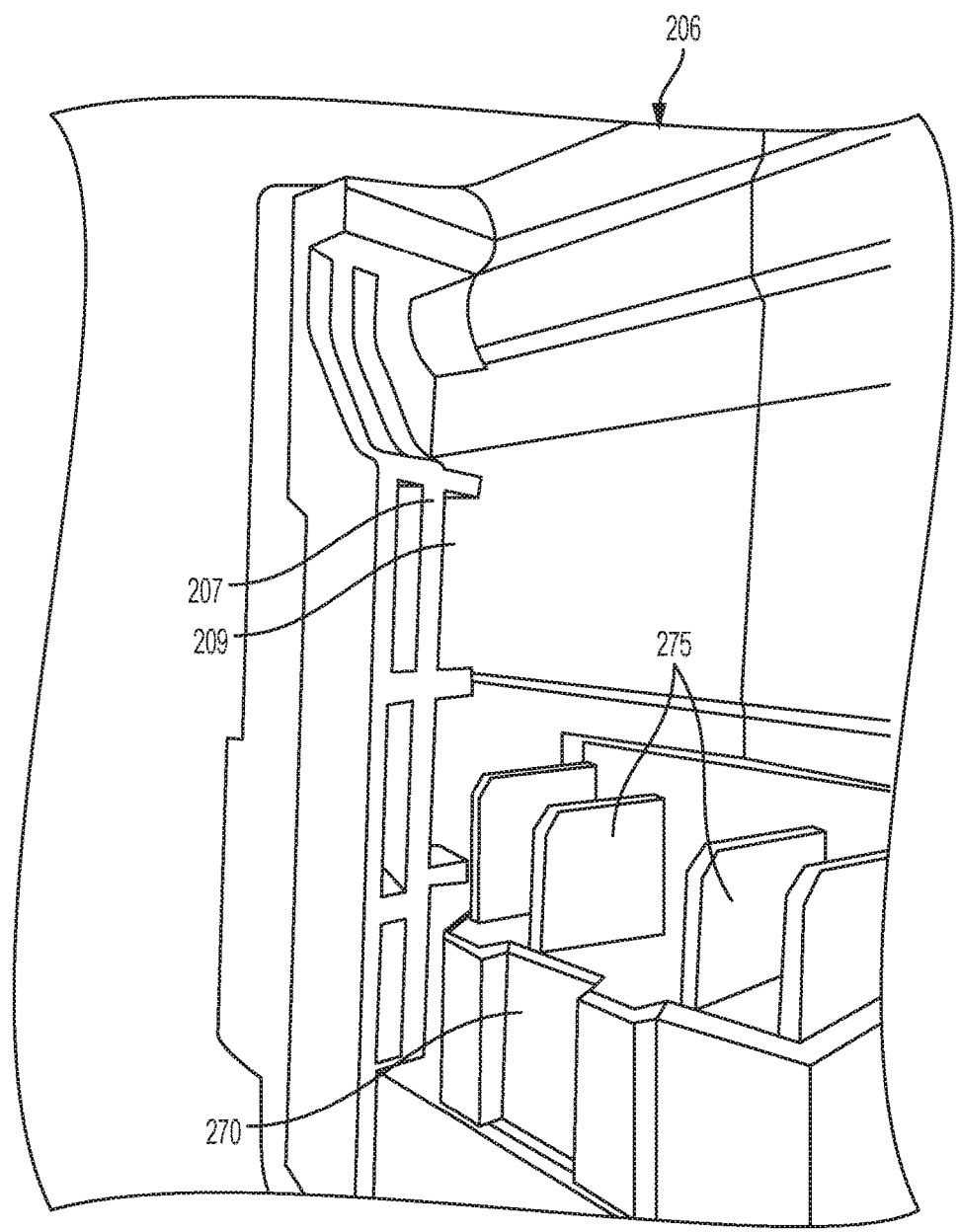
Figure 12D:
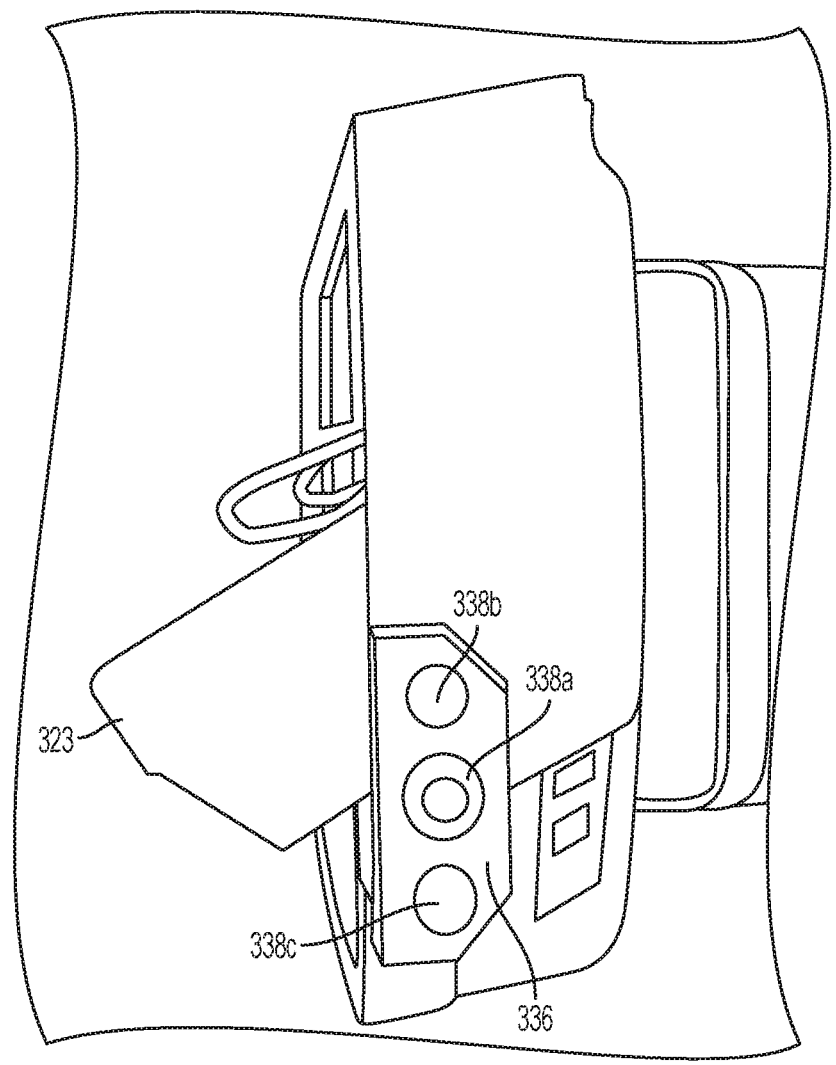

FIG. 5 illustrates the battery pack receiving portion 206. The battery pack receiving portion 206 is configured to receive and couple to a battery pack 215 (for example, power tool device 104b illustrated in FIG. 1) that provides power to the power tool 104. The battery pack 215 may also be referred to as a main power source 215. The battery pack receiving portion 206 includes a connecting structure to engage a mechanism that secures the battery pack 215 and a terminal block 270 to electrically connect the battery pack 215 to the power tool 104. In the illustrated embodiment, the connecting structure includes guides 207 and notches 209 (see FIGS. 12B and 12C) to secure the battery pack to the power tool 104. The terminal block 270 includes terminals 275 that make contact with terminals of the battery pack 215 when the battery pack 215 is coupled to the battery pack receiving portion 206. Such contact allows for the power tool 104 to be electrically connected to the battery pack 215.

Figure 6A:
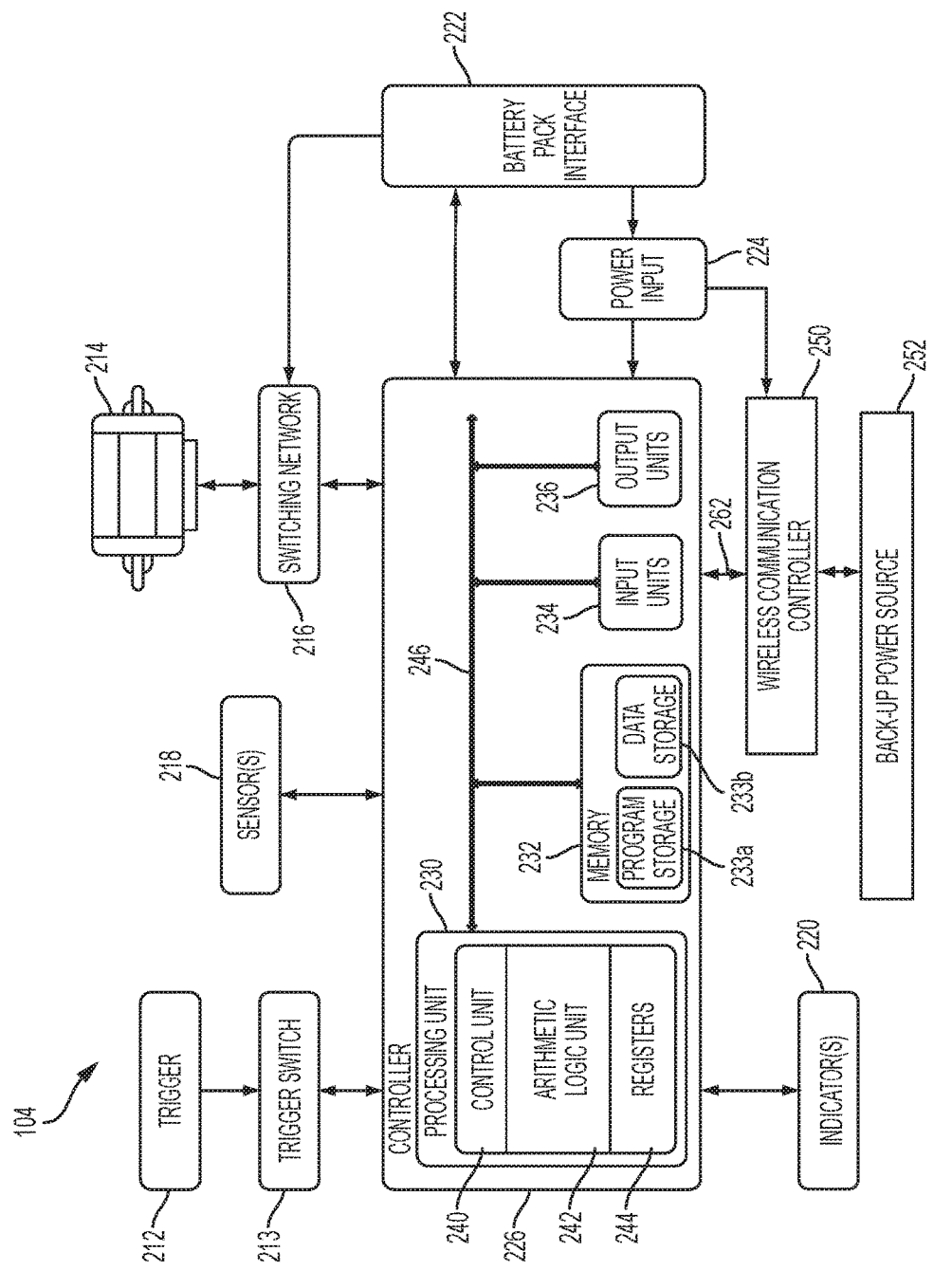
FIGS. 6A-B illustrate a schematic diagram of the power tool.

FIG. 6A illustrates a block diagram of some embodiments of the power tool 104, such as those with motors (e.g., the impact driver 104a of FIG. 1). As shown in FIG. 6A, the power tool 104 also includes a motor 214. The motor 214 actuates the drive device 210 and allows the drive device 210 to perform the particular task. The primary power source (e.g., the battery pack) 215 couples to the power tool 104 and provides electrical power to energize the motor 214. The motor 214 is energized based on the position of the trigger 212. When the trigger 212 is depressed the motor 214 is energized, and when the trigger 212 is released, the motor 214 is de-energized. In the illustrated embodiment, the trigger 212 extends partially down a length of the handle 204; however, in other embodiments the trigger 212 extends down the entire length of the handle 204 or may be positioned elsewhere on the power tool 104. The trigger 212 is moveably coupled to the handle 204 such that the trigger 212 moves with respect to the tool housing. The trigger 212 is coupled to a push rod, which is engageable with a trigger switch 213 (see FIG. 6A). The trigger 212 moves in a first direction towards the handle 204 when the trigger 212 is depressed by the user. The trigger 212 is biased (e.g., with a spring) such that it moves in a second direction away from the handle 204, when the trigger 212 is released by the user. When the trigger 212 is depressed by the user, the push rod activates the trigger switch 213, and when the trigger 212 is released by the user, the trigger switch 213 is deactivated. In other embodiments, the trigger switch 213 is an electrical trigger switch 213, and the trigger 212 is coupled to the electrical trigger switch 213. In such embodiments, the trigger switch 213 may include, for example, a transistor. Additionally, for such electronic embodiments, the trigger 212 may not include a push rod to activate the mechanical switch. Rather, the electrical trigger switch 213 may be activated by, for example, a position sensor (e.g., a Hall-Effect sensor) that relays information about the relative position of the trigger 212 to the electrical trigger switch 213.

Figure 6B:
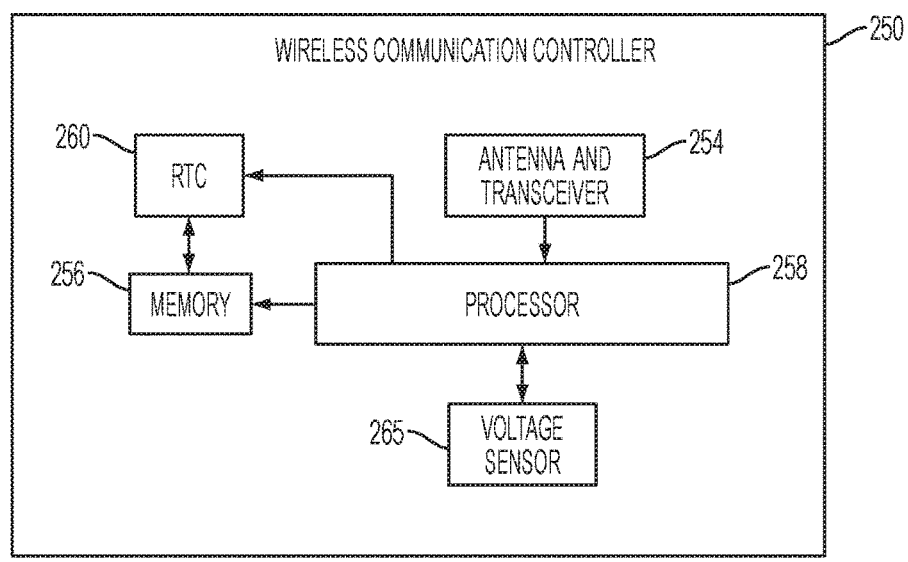

As shown in FIG. 6A, the power tool 104 also includes a switching network 216, sensors 218, indicators 220, a battery pack interface 222, a power input unit 224, a controller 226, a wireless communication controller 250, a backup power source 252, and a real-time clock (RTC) 260. In some embodiments, the RTC 260 is part of the wireless communication controller 250 as shown in FIG. 6B. Additionally, in some embodiments, the wireless communication controller 250 may be combined to be a component of the controller 226. The battery pack interface 222 is coupled to the controller 226 and couples to the battery pack 215. The battery pack interface 222 includes a combination of mechanical (e.g., the battery pack receiving portion 206) and electrical components configured to and operable for interfacing (e.g., mechanically, electrically, and communicatively connecting) the power tool 104 with a battery pack 215. The battery pack interface 222 is coupled to the power input unit 224. The battery pack interface 222 transmits the power received from the battery pack 215 to the power input unit 224. The power input unit 224 includes combinations of active and passive components (e.g., voltage step-down controllers, voltage converters, rectifiers, filters, etc.) to regulate or control the power received through the battery pack interface 222 and provided to the wireless communication controller 250 and controller 226.

The switching network 216 enables the controller 226 to control the operation of the motor 214. Generally, when the trigger 212 is depressed (i.e., the trigger switch 213 is closed), electrical current is supplied from the battery pack interface 222 to the motor 214, via the switching network 216. When the trigger 212 is not depressed, electrical current is not supplied from the battery pack interface 222 to the motor 214. In some embodiments, the trigger switch 213 may include sensors to detect the amount of trigger pull (e.g., released, 20% pull, 50% pull, 75% pull, or fully depressed). In some embodiments, the amount of trigger pull detected by the trigger switch 213 is related to or corresponds to a desired speed of rotation of the motor 214. In other embodiments, the amount of trigger pull detected by the trigger switch 213 is related to or corresponds to a desired torque.

In response to the controller 226 receiving the activation signal from the trigger switch 213, the controller 226 activates the switching network 216 to provide power to the motor 214. The switching network 216 controls the amount of current available to the motor 214 and thereby controls the speed and torque output of the motor 214. The switching network 216 may include numerous field effect transistors (FETs), bipolar transistors, or other types of electrical switches.

The sensors 218 are coupled to the controller 226 and communicate to the controller 226 various signals indicative of different parameters of the power tool 104 or the motor 214. The sensors 218 include, for example, one or more current sensors, one or more voltage sensors, one or more temperature sensors, one or more speed sensors, one or more Hall Effect sensors, etc. For example, the speed of the motor 214 can be determined using a plurality of Hall Effect sensors to sense the rotational position of the motor 214. In some embodiments, the controller 226 controls the switching network 216 in response to signals received from the sensors 218. For example, if the controller 226 determines that the speed of the motor 214 is increasing too rapidly based on information received from the sensors 218, the controller 226 may adapt or modify the active switches or switching sequence within the switching network 216 to reduce the speed of the motor 214. Data obtained via the sensors 218 may be saved in the controller 226 as tool usage data.

The indicators 220 are also coupled to the controller 226 and receive control signals from the controller 226 to turn on and off or otherwise convey information based on different states of the power tool 104. The indicators 220 include, for example, one or more light-emitting diodes ("LED"), or a display screen. The indicators 220 can be configured to display conditions of, or information associated with, the power tool 104. For example, the indicators 220 are configured to indicate measured electrical characteristics of the power tool 104, the status of the power tool 104, etc. The indicators 220 may also include elements to convey information to a user through audible or tactile outputs.

As described above, the controller 226 is electrically and/or communicatively connected to a variety of modules or components of the power tool 104. In some embodiments, the controller 226 includes a plurality of electrical and electronic components that provide power, operational control, and protection to the components and modules within the controller 226 and/or power tool 104. For example, the controller 226 includes, among other things, a processing unit 230 (e.g., a microprocessor, a microcontroller, or another suitable programmable device), a memory 232, input units 234, and output units 236. The processing unit 230 includes, among other things, a control unit 240, an arithmetic logic unit ("ALU") 242, and a plurality of registers 244 (shown as a group of registers in FIG. 6A). In some embodiments, the controller 226 is implemented partially or entirely on a semiconductor (e.g., a field-programmable gate array ["FPGA"] semiconductor) chip, such as a chip developed through a register transfer level ("RTL") design process.

The memory 232 includes, for example, a program storage area 233a and a data storage area 233b. The program storage area 233a and the data storage area 233b can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 230 is connected to the memory 232 and executes software instructions that are capable of being stored in a RAM of the memory 232 (e.g., during execution), a ROM of the memory 232 (e.g., on a generally permanent basis), or another non-transitory computer readable medium such as another memory or a disc. Software included in the implementation of the power tool 104 can be stored in the memory 232 of the controller 226. The software includes, for example, firmware, one or more applications, program data, filters, rules, one or more program modules, and other executable instructions. The controller 226 is configured to retrieve from memory and execute, among other things, instructions related to the control processes and methods described herein. The controller 226 is also configured to store power tool information on the memory 232. The power tool information stored on the memory 232 may include power tool identification information (e.g., including a unique identifier of the power tool 104) and also power tool operational information including information regarding the usage of the power tool 104, information regarding the maintenance of the power tool 104, power tool trigger event information, and other information relevant to operating or maintaining the power tool 104. Such power tool information may then be accessed by a user with the external device 108. In other constructions, the controller 226 includes additional, fewer, or different components.

The wireless communication controller 250 is coupled to the controller 226. In the illustrated embodiment, the wireless communication controller 250 is located near the foot of the power tool 104 (see FIG. 3) to save space and ensure that the magnetic activity of the motor 214 does not affect the wireless communication between the power tool 104 and the external device 108. As a particular example, in some embodiments, the wireless communication controller 250 is positioned under the user interface 261 on the foot of the power tool 104, which includes the mode selection switch 208 and an example of the indicators 220 (in the form of a mode indicator) in a recess spanning a dividing line of the power tool's clam shell housing. As shown in FIG. 6B, the wireless communication controller 250 includes an antenna and radio transceiver 254, a memory 256, a processor 258, and a real-time clock (RTC) 260. The antenna and radio transceiver 254 operate together to send and receive wireless messages to and from an external device 108 and the processor 258. The memory 256 can store instructions to be implemented by the processor 258 and/or may store data related to communications between the power tool 104 and the external communication device 108 or the like. The processor 258 for the wireless communication controller 250 controls wireless communications between the power tool 104 and the external device 108. For example, the processor 258 associated with the wireless communication controller 250 buffers incoming and/or outgoing data, communicates with the controller 226, and determines the communication protocol and/or settings to use in wireless communications.

In the illustrated embodiment, the wireless communication controller 250 is a Bluetooth® controller. The Bluetooth® controller communicates with the external device 108 employing the Bluetooth® protocol. Therefore, in the illustrated embodiment, the external device 108 and the power tool 104 are within a communication range (i.e., in proximity) of each other while they exchange data. In other embodiments, the wireless communication controller 250 communicates using other protocols (e.g., Wi-Fi, cellular protocols, etc.) over a different type of wireless network. For example, the wireless communication controller 250 may be configured to communicate via Wi-Fi through a wide area network such as the Internet or a local area network, or to communicate through a piconet (e.g., using infrared or NFC communications). The communication via the wireless communication controller 250 may be encrypted to protect the data exchanged between the power tool 104 and the external device 108 (or network) from third parties. In the illustrated embodiment, the wireless communication controller 250 is configured to periodically broadcast an identification signal, also referred to as identification information or identification data. The identification signal includes identification information for the power tool 104, such as a unique identifier. The external device 108 identifies the power tool 104 via the identification signal. Additionally or alternatively, the wireless communication controller 250 may be configured to respond to a ping signal from the external device 108. In other words, the wireless communication controller 250 may not periodically broadcast the identification signal, but rather the wireless communication controller 250 may wait for a ping signal from the external device 108 to send the identification signal.

The wireless communication controller 250 is configured to receive data from the power tool controller 226 and relay the information to the external device 108 via the antenna and transceiver 254. In a similar manner, the wireless communication controller 250 is configured to receive information (e.g., configuration and programming information) from the external device 108 via the antenna and transceiver 254 and relay the information to the power tool controller 226.

The RTC 260 increments and keeps time independently of the other power tool components. In the illustrated embodiment, the RTC 260 is powered through the wireless communication controller 250 when the wireless communication controller 250 is powered. In some embodiments, however, the RTC 260 is a separate component from the wireless communication controller 250. In such embodiments, the RTC 260 receives power from the battery pack 215 (e.g., a main or primary power source) when the battery pack 215 is connected to the power tool 104. The RTC 260 receives power from the backup power source 252 (e.g., a coin cell battery, another type of battery cell, a capacitor, or another energy storage device) when the battery pack 215 is not connected to the power tool 104. Therefore, the RTC 260 keeps track of time regardless of whether the power tool 104 is in operation, and regardless of whether the battery pack 215 is connected to the power tool 104. When no power source is present (i.e., the battery pack 215 is detached from the power tool 104 and the backup power source 252 is removed or depleted), the RTC 260 stores the last valid time. When a power source is replaced (i.e., the battery pack 215 is attached to the power tool 104 and/or the backup power source 252 is replaced), the RTC 260 uses the stored time as a starting point to resume keeping time.

The starting time for the RTC 260 is set to current Greenwich mean time (GMT) time at the factory at time of manufacture. The time is updated or synchronized whenever the wireless communication controller 250 communicates with the external device 108. Because GMT time is independent of calendar, seasons, or time schemas, using GMT time allows the power tool 104 or the external device 108 to convert from time indicated by the RTC 260 to localized time for display to the user.

Because the RTC 260 is able to maintain accurate time whether or not the battery pack 215 is attached to the power tool 104, the RTC 260 is configured to time-stamp (i.e., associate a specific time with) the operational data of the power tool 104. For example, the controller 226 can store the operational data when, for example, the power tool 104 is fastening a group of fasteners. The controller 226 then receives an indication of time (e.g., a GMT time) from the RTC 260 or from the processor 258 associated with the wireless communication controller 250. The controller 226 proceeds to store the operational data (e.g., the torque output by the power tool 104, the speed of the motor 214, the number of trigger pulls, etc.) with a time-stamp provided based on the received time from the RTC 260. The RTC 260 can continuously or periodically provide an indication of time to the controller 226. In other embodiments, the controller 226 requests a time signal from the processor 258 of the wireless communication controller 250 and waits for the time signal from the RTC 260.

The RTC 260 also allows the controller 226 to keep track of maintenance and/or service schedules. For example, maintenance for a particular tool may be scheduled once every year. The maintenance time or date can be stored in the memory 232 or 256 and the controller 226 or 250 periodically compares the time from the RTC 260 to the stored maintenance time or date and generates an alert when the date/time is reached. The alert can be sent to the external device 108 and/or be signaled via indicators 220.

The RTC 260 also enables the power tool 104 to implement a time-based lock-out feature. In the time-based lock-out feature, the memory 232 or 256 may also store a security date and time information or a timer amount. The controller 226 monitors the time received from the RTC 260 and compares the current time from the RTC 260 to the user-specified lock-out time stored in the memory 232 or 256. When the current time from the RTC 260 exceeds the user-specified lock-out time, the controller 226 locks the power tool 104 (e.g., the power tool 104 is disabled such that driving the motor 214 is prevented). The power tool 104, therefore, becomes inoperable. Since the RTC 260 keeps time independent of other components in the power tool 104 and independent of the operation of the power tool 104, the controller 226 can more accurately track when maintenance or service for a particular tool or a particular part is due and/or when a specified time for a security feature is approaching.

The processor 258 of the wireless communication controller 250 switches between operating in a connectable (e.g., full power) state and operating in an advertisement state. The wireless communication controller 250 operates in the connectable state when the battery pack 215 is attached to the power tool 104 and contains sufficient charge to power the wireless communication controller 250 and the controller 226, and to support substantive electronic data communication between the power tool 104 and the external device 108. When the wireless communication controller 250 operates in the connectable state, wireless communication between the power tool 104 and the external device 108 is enabled. In the connectable state, the wireless communication controller 250 obtains and exports tool operational data including tool usage data, maintenance data, mode information, drive device information, and the like from the power tool 104. The exported operational data is received by the external device 108 and can be used by tool users or owners to log operational data related to a particular power tool 104 or to specific job activities. The exported and logged operational data can indicate when work was accomplished and that work was accomplished to specification. The logged operational data can also provide a chronological record of work that was performed, track duration of tool usage, and the like. In the connectable state, the wireless communication controller 250 also imports (i.e., receives) configuration data from the external device 108 into the power tool 104 such as, for example, operation thresholds, maintenance thresholds, mode configurations, programming for the power tool 104, feature information, and the like. The configuration data is provided by the wireless communication controller 250 to the controller 226 over communication channel 262, and the processing unit 230 stores the configuration data in the memory 232. The processing unit 230 further accesses the configuration data stored in the memory 232 and controls driving of the motor 214 in accordance with the configuration data. For example, the processing unit 230 may drive the motor 214 at a particular speed or until a particular torque is reached (e.g., as detected by the sensors 218), where the particular speed or torque is provided as part of the configuration data.

If the battery pack 215 is not connected to the wireless communication controller 250 or if the battery pack 215 is depleted, the wireless communication controller 250 operates in the advertisement state. While in the advertisement state, the wireless communication controller 250 receives power from the backup power source 252 (e.g., a coin cell battery, another type of battery cell, a capacitor, or another energy storage device). The backup power source 252 provides sufficient power for the wireless communication controller 250 to periodically broadcast an advertisement message, but may not provide sufficient power to allow the wireless communication controller 250 to engage in further data exchange with the external device 108, or, such further data exchange would deplete the backup power source 252 more rapidly than desired. In other words, the communication capabilities of the power tool 104 are limited or restricted when the wireless communication controller 250 is in the advertisement state. In some embodiments, when the wireless communication controller 250 operates in the connectable state, the backup power source 252 does not provide power to the wireless communication controller 250 and battery life of the backup power source 252 is therefore extended.

Figure 7:
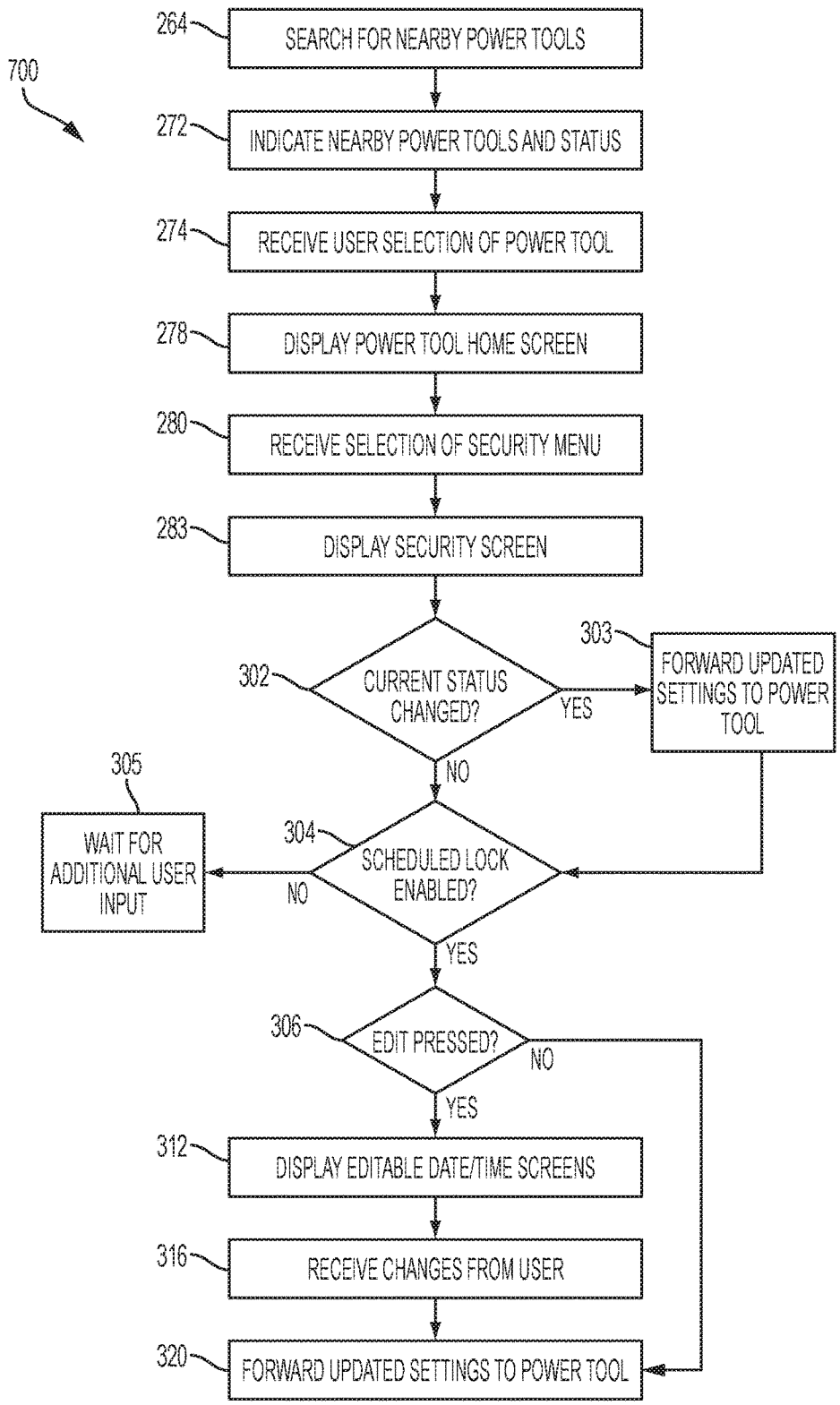
FIG. 7 is a flowchart illustrating a method of changing settings associated with a security feature.

The external device 108 can enable a security feature of the power tool 104. In such embodiments, a user enables the security feature through the control application executed by the external device 108. The external device 108 then communicates with the wireless communication controller 250 to indicate to the power tool 104 that the user has enabled the security feature. FIG. 7 illustrates an exemplary method 700 for enabling and implementing the security feature. The control application receives user instructions to search for the power tools 104 (or power tool devices) that are within the communication range of the external device 108 (at block 264). The control application determines which power tools 104 are within the communication range based on the advertisement messages broadcasted by the power tools 104 and received by the external device 108.

Figure 8:
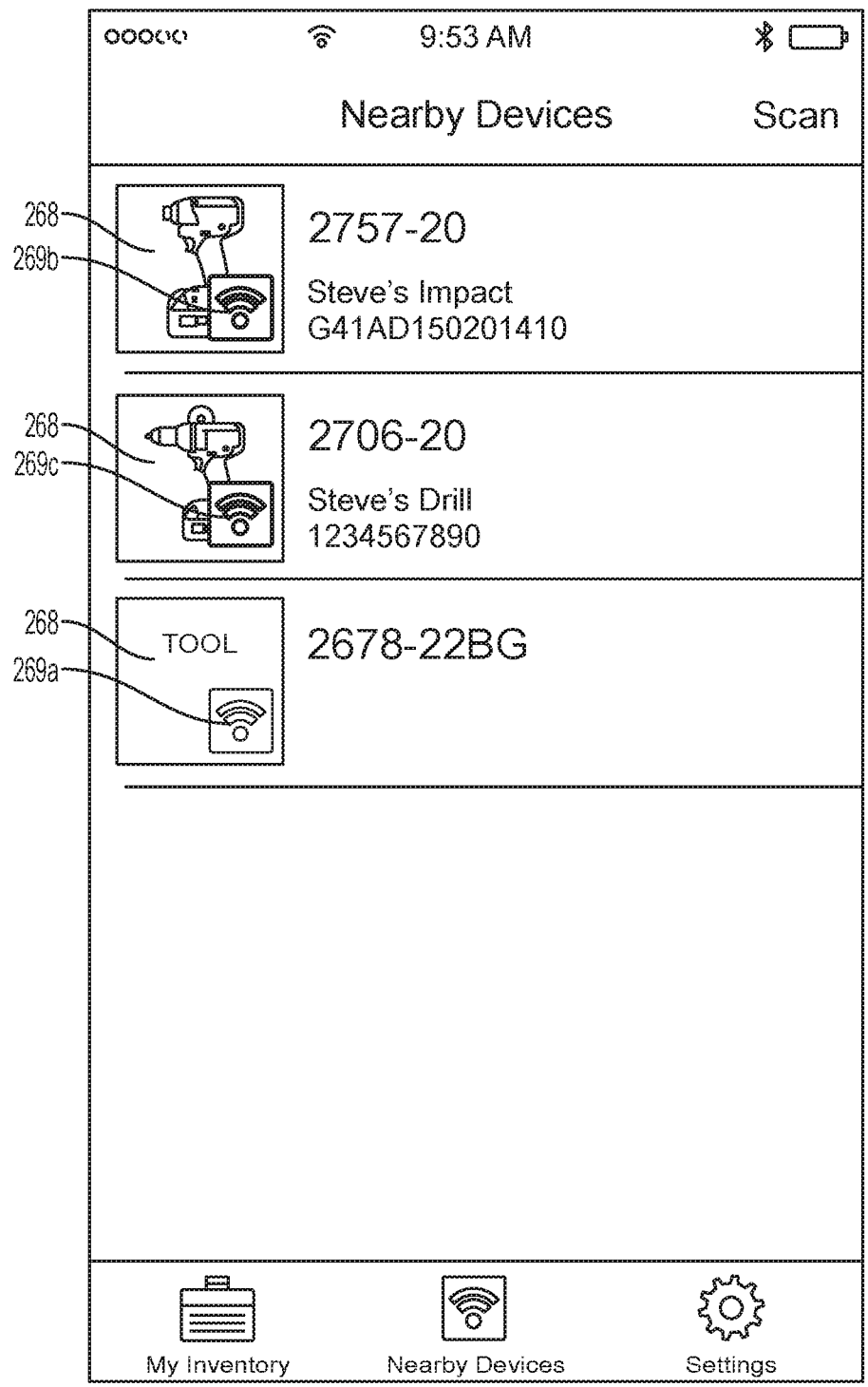
FIG. 8 illustrates an exemplary screenshot of a user interface of an external device of the communication system.

The external device 108 identifies to the user which power tools 104 are within the communication range by displaying a tool icon 268 for each power tool within the communication range, as shown in FIG. 8 (at block 272). The tool icon 268 includes an icon image and accompanying identification text data for each power tool (e.g., Steve's Drill). The icon image may be a photograph obtained from, for example, the manufacturer that represents the selected power tool 104, and/or the icon image may be a photograph obtained from the user that represents the power tool 104. The external device 108 also identifies to the user whether the power tool 104 is in the connectable state or in the advertisement state (i.e., the status of the power tool 104). This identification by the external device 108 indicates to the user the identity of power tools 104 that are within the communication range of the external device 108, the state of each power tool 104 that is within communication range, and whether substantive data exchange can occur between each of the power tools 104 and the external device 108.

In some embodiments, the icon 268 representing the power tool 104 on the graphical user interface of the external device 108 changes based on the mode of the power tool 104. For example, in the some embodiments, the icon 268 for the power tool 104 is white on blue when the power tool 104 is in the connectable state, and gray on white when the power tool 104 is in the advertisement state. Stated another way, the text or icons corresponding to power tools 104 in the advertisement state may be displayed in a grayed-out or faded manner (see, e.g., symbol 269a) relative to power tools in the connectable state (see, e.g., symbol 269b). In other embodiments, the specific icons 268 corresponding to the connectable state and to the advertisement state may be different (e.g., in shape, symbol, or text), rather than merely in color, and the icon 268 corresponding to the connectable state is distinguishable from the icon corresponding to the advertisement state. The icons 268 can have different tool colors, background colors, symbols, letters, and the like depending on the state of the power tool 104 (e.g., connectable state or advertisement state). The icons 268 can flash, not flash, or flash at different frequency depending on whether the power tool 104 is in the connectable state or the advertisement state. Additionally, in some embodiments, the external device 108 also displays different icons 268 for other states of the power tool 104. For example, if the power tool 104 is in operation (i.e., the motor 214 is running or has been run recently), the external device 108 displays a first icon. If the power tool 104 is in the connectable state but not in operation, the external device 108 displays a second icon. If the power tool 104 is in the advertisement state and the backup power source 252 holds sufficient power, the external device 108 displays a third icon. The external device 108 may display a fourth icon if the backup power source 252 is low, and a fifth icon if the tool 104 experiences intermittent communication. Additionally, the icon 268 may change corresponding to how many seconds have passed since the advertisement or communication was last received from the power tool 104.

The external device 108 determines the state of the power tool 104 based on the information it receives from the power tool 104. For example, in some embodiments, when the power tool 104 is in operation, the wireless communication controller 250 sends a corresponding signal to the external device 108 indicating that the motor 214 is currently operating. As another example, when the power tool 104 is in the advertisement state (i.e., the battery pack 215 is detached from the power tool 104), the wireless communication controller 250 sends a corresponding advertisement message to the external device 108. The external device 108 determines the state of the power tool 104 based on the received signal and changes the icons 268 according to the determined state of the power tool 104.

When the wireless communication controller 250 operates in the advertisement state, the power tool 104 identifies itself to the external device 108, but data exchange between the power tool 104 and the external device 108 is limited to select information. In other words, in the advertisement state, the wireless communication controller 250 outputs an advertisement message to the external device 108. The advertisement message includes one or more of identification information regarding the tool identity (e.g., a serial number or other unique tool identifier), remaining capacity of the backup power source 252, and other limited amount of power tool information (e.g., configuration information used by third-party smartphone applications). The advertisement message also identifies the product as being from a particular manufacturer or brand via a global unique identification (GUID) that includes the power tool's specific make, model, and serial number. Even when operating in the advertisement state, the external device 108 can identify the power tool 104 and determine that the power tool 104 is within a communication range of the external device 108 (e.g., locate the power tool 104) based on the advertisement message, but further data between the external device 108 and the power tool 104 is not exchanged. The tool identification also allows for specific identification of power tools to differentiate between different power tools of the same module.

Figure 9:
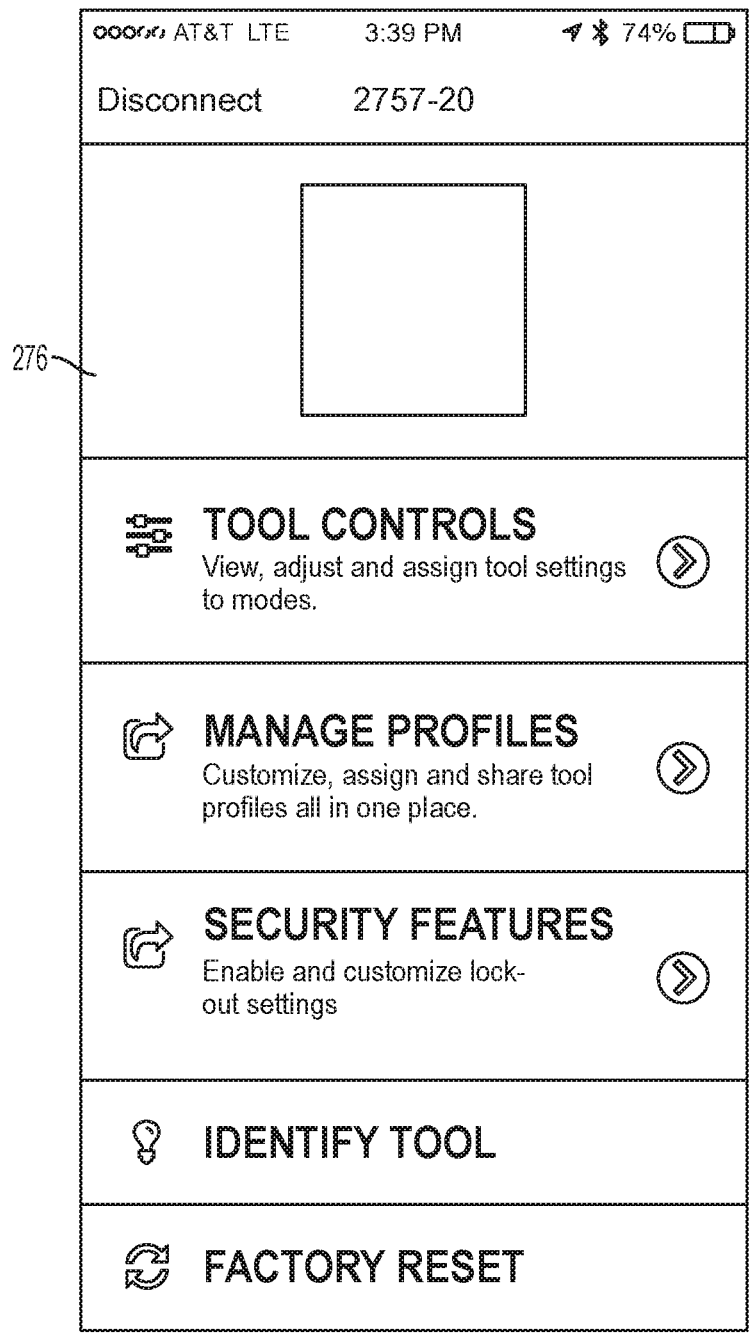
FIG. 9 illustrates an exemplary home screen for a power tool.

Based on the displayed list of power tools 104, the user selects a particular tool 104 to enable the security feature. Returning to FIG. 7, the control application running on the external device 108 receives the user's selection of the particular power tool 104 (at block 274). In response to receiving the user's selection of the particular power tool 104, the control application running on the external device 108 displays a home screen 276 particular to the selected power tool 104, as shown in FIG. 9 (at block 278). The home screen 276 for the selected power tool 104 allows the user to control different aspects of the power tool 104. For example, in the illustrated embodiment, the control application enables the user to view, assign, and adjust tool settings to different power tool modes. The control application also enables the user to customize, assign, and share tool profiles. The control application also enables the user to enable and customize lock-out settings for the power tool 104. In particular, a user can select to expand the menu associated with the security feature (e.g., "SECURITY FEATURES") to change and/or update the settings associated with the lock-out feature. Returning to FIG. 7, the control application receives the user selection of the "SECURITY FEATURES" option (i.e., the security menu) (at block 280). In response to receiving the user selection of the security menu, the control application displays a security screen 282, as shown in FIG. 10A-10D (at block 283).

Figure 10A:
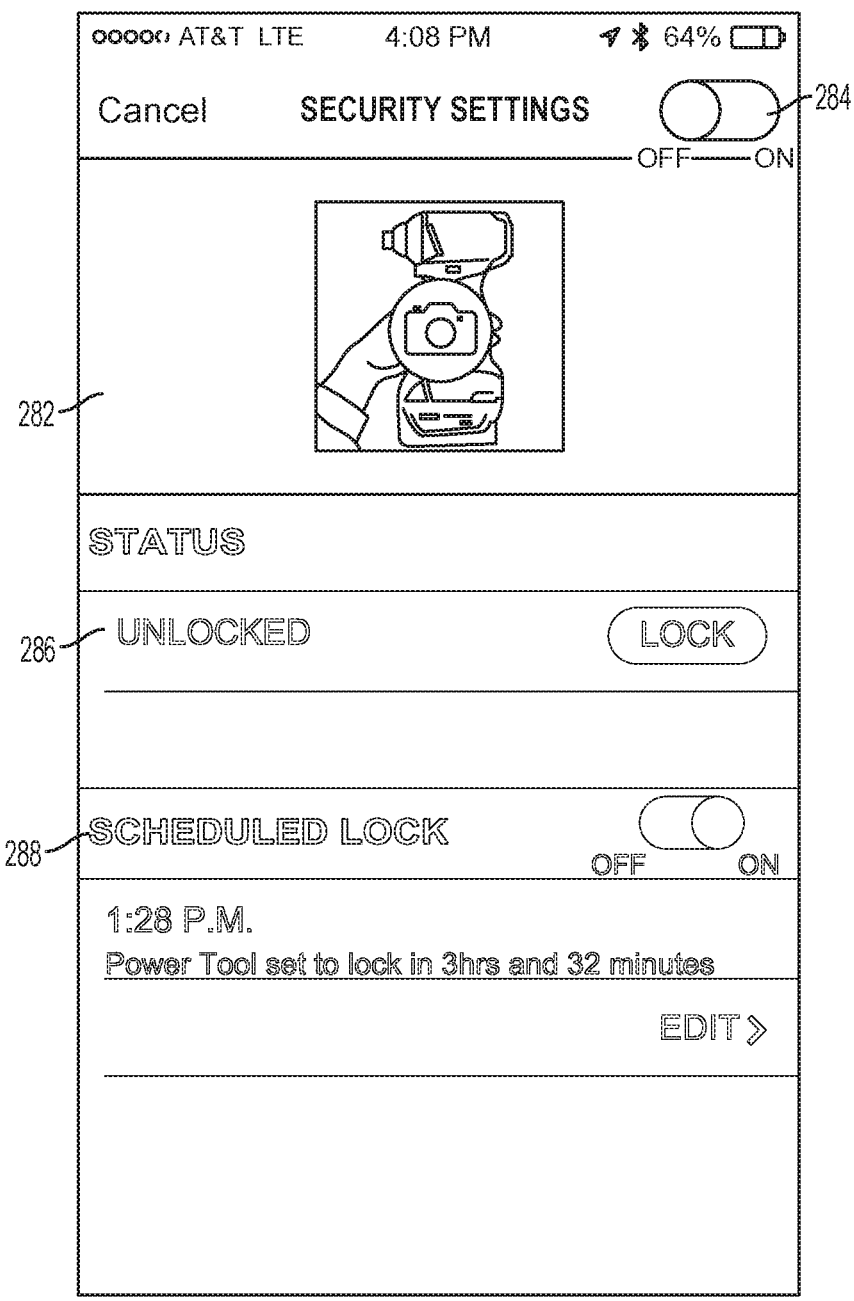
FIGS. 10A-D illustrate exemplary security screens for the power tool.
Figure 10B:
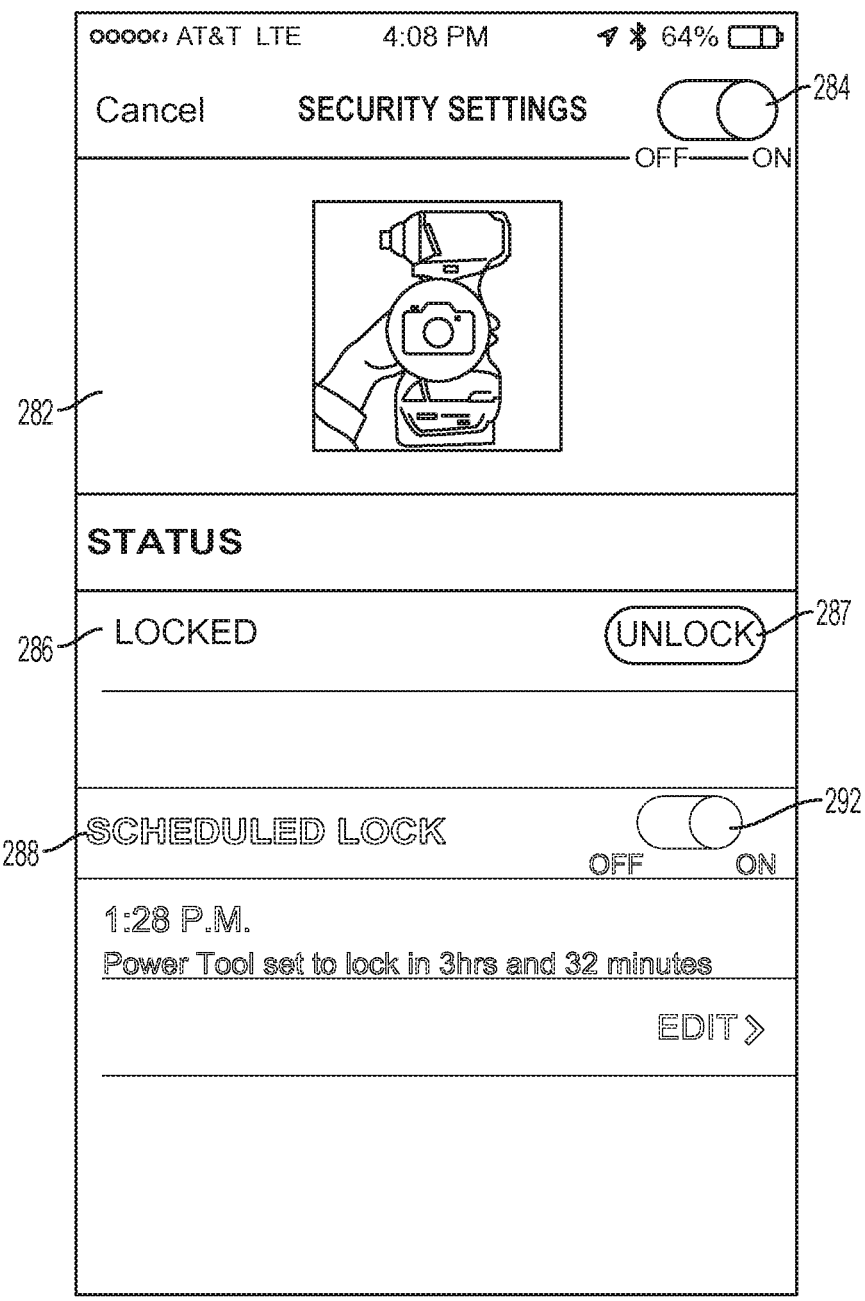

As shown in FIGS. 10A-B, the security screen 282 includes an on/off indicator 284, a current status indicator 286, and a scheduled lock option 288. The on/off indicator 284 indicates the general setting for the security feature. The on/off indicator 284 is movable between an ON position and an OFF position. As shown in FIG. 10A, when the on/off indicator 284 is in the OFF position, the lock-out feature is disabled and the power tool 104 can operate openly without restrictions from the security feature. When the security feature is disabled, the current status indicator 286 and the scheduled lock option 288 are grayed out and disabled. In other words, the control application disables the user's ability to change the current security status of the power tool 104 and/or set a scheduled lock when the security feature is disabled. In FIG. 10A, to indicate that the current status indicator 286 and the scheduled lock option 288 are disabled, these items are shown in hollowed blocked letters.

If, on the other hand, the on/off indicator 284 is in the ON position, as shown in FIG. 10B, the lock-out feature is enabled and the user can specify different settings of the security feature. The security screen 282 indicates the current security status of the power tool 104 using a current status indicator 286. The security feature enables two types of security control. The first security control is a direct control of the power tool operation regulated by a current status selector 287. The second security control is regulated by the scheduled lock options 288. The current status selector 287 allows the user to change the current security status of the power tool 104. For example, the external device 108 may receive a user selection via the current status selector 287 to switch the current status of the power tool 104 between unlocked and locked. The current status selector 287 shows the opposite option as the current status of the power tool 104. For example, when the current status of the power tool 104 is "locked," the current status selector 287 shows an option to "unlock" the power tool 104. In contrast, when the current status of the power tool 104 is "unlocked," the current status selector 287 shows an option to "lock" the power tool 104. The current status selector 287 provides a binary option for switching the power tool 104 between an operable state and a locked-out state.

In the illustrated example of FIG. 10B, the current status of the power tool 104 is "locked." Therefore, the power tool 104 is restricted in its operation and is currently under lock-out (e.g., not enabled to operate). In some embodiments, the power tool 104 may be under lock-out by providing minimal power to the motor 214 of the power tool 104. In other embodiments, the power tool 104 may be under lock-out by inhibiting electrical power from reaching the motor 214 of the power tool 104, thereby rendering the power tool 104 inoperable. While the current status of the power tool 104 is "locked," the scheduled lock option 288 is grayed out and unavailable for user selection. In FIG. 10B, to indicate that the scheduled lock option 288 is not available for selection, it is shown in hollowed blocked letters. On the other hand, the current status selector 287 is shown in solid letters to indicate that it is enabled and available for selection.

Returning to FIG. 7, when implementing the security feature, the control application determines whether the user changed the current status of the power tool 104 (at block 302) using the current status selector 287. If the control application determines that the current status of the power tool 104 has changed, the control application proceeds to block 303 and forwards the updated security settings (e.g., lock or unlock) to the power tool 104. The control application then proceeds to determine whether the user has changed settings associated with the scheduled lock (at blocks 304-316). If the control application determines that the current status of the power tool 104 has not changed in block 302, the control application proceeds to determine whether the user has changed settings associated with the scheduled lock (at blocks 304-316).

Figure 10C:
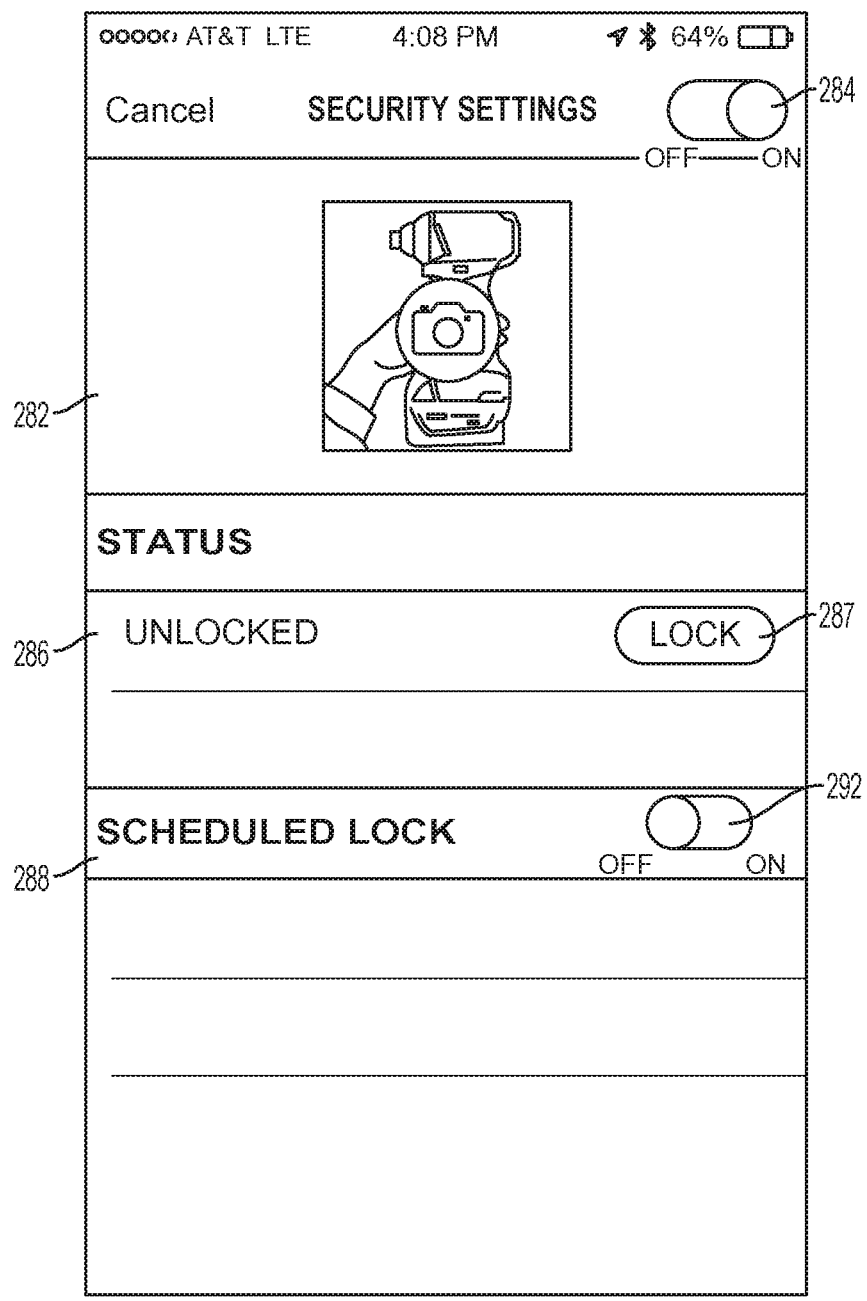

For example, as shown in FIG. 10C, the current status of the power tool 104 is "unlocked," as indicated by the current status indicator 286. Therefore, the power tool 104 is operable. When the current status of the power tool 104 is "unlocked," the scheduled lock option 288 is available for user selection. In FIG. 10C, to indicate that the scheduled lock option 288 is available for selection, it is shown in solid letters similar to the current status indicator 286.

Figure 10D:
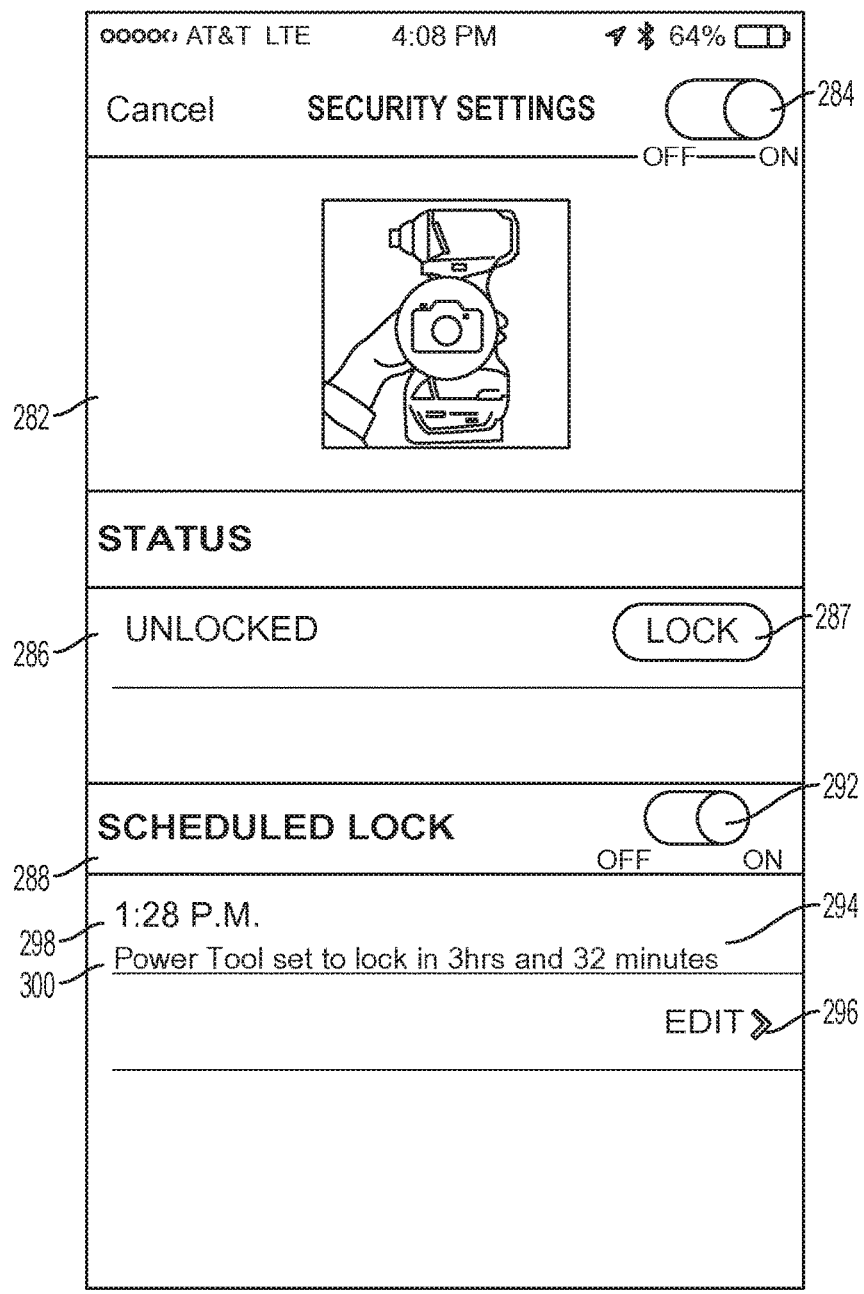

As shown in FIGS. 10C and 10D, the scheduled lock option 288 includes a schedule lock on/off selector 292, a future lock-out indication 294, and an edit option 296. The schedule lock on/off selector 292 enables and disables the scheduled lock option 288 accordingly. When the scheduled lock is disabled (i.e., the on/off selector 292 is in the OFF position as shown in FIG. 10C), the power tool 104 operates according to the current status selector 287. When the schedule lock is enabled, however, (i.e., the on/off selector 292 is in the ON position as shown in FIG. 10D) the control application displays the future lock-out indication 294. The future lock-out indication 294 indicates to the user a current time 298 and an indication 300 of the remaining time before the power tool 104 is under lock-out. In some embodiments, instead of the current time 298, the control application displays the defined lock-out time and the remaining time before the power tool 104 becomes inoperable. Returning to FIG. 7, at block 304, the control application determines whether the scheduled lock is enabled (at block 304). If the scheduled lock is disabled (e.g., the on/off selector 292 is in the OFF position), the control application waits for additional user input (e.g., pressing of a back or cancel key) and responds accordingly (at block 305). For example, the control application may return to a previous block of the method 700 based on the additional user input.

Figure 11:
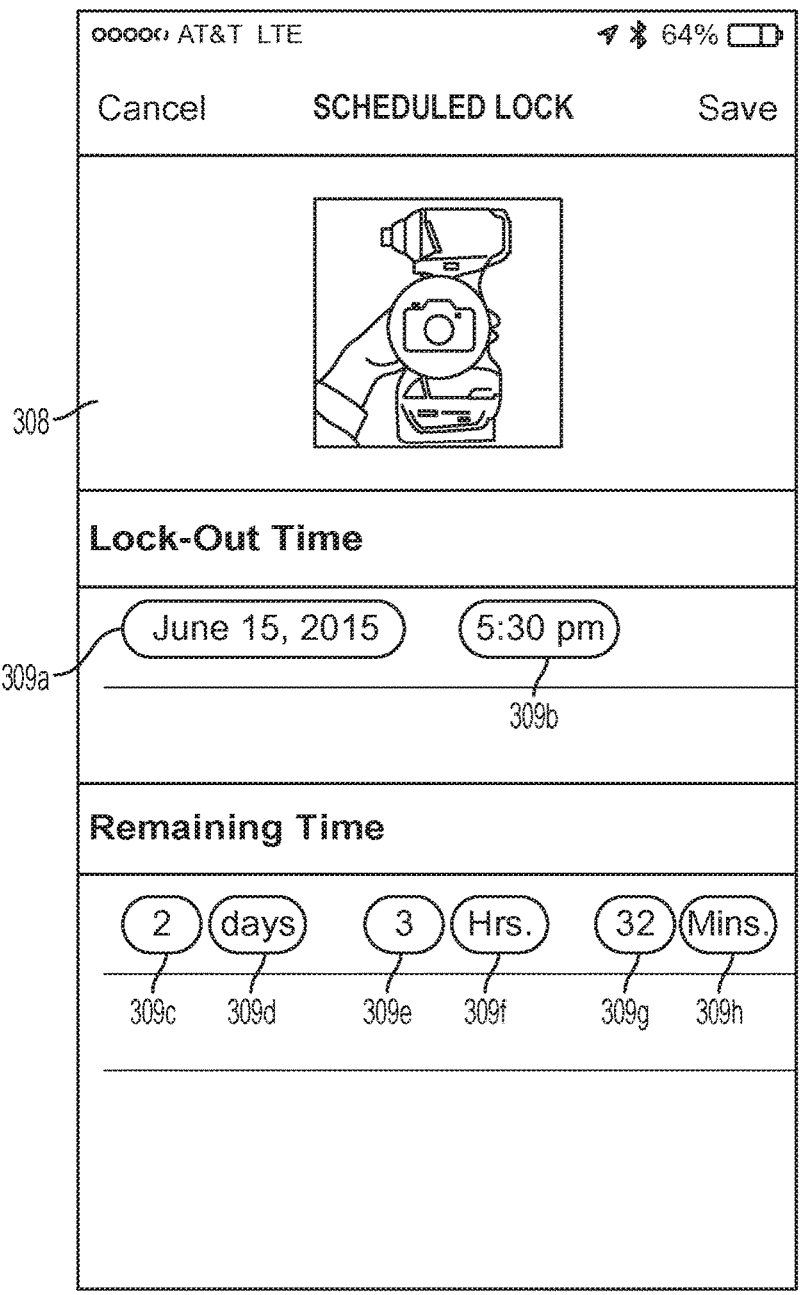
FIG. 11 illustrates an exemplary scheduled lock screen for the power tool.

On the other hand, if the scheduled lock is enabled, the control application determines whether the edit option 296 has been selected (at block 306). If the control application determines that the edit option 296 is not selected, the control application proceeds to block 320 and forwards updated settings to the power tool 104. In some instances (e.g., when the user does not change any security settings), the control application bypasses block 320 and proceeds back to block 283. If the control application receives an indication that the user selected the edit option 296, the control application displays a scheduled lock edit screen 308, as shown in FIG. 11 (at block 312).

The edit option 296 and the edit screen 308 allow the user to change the specified time before the power tool 104 becomes inoperable due to the security feature. As shown in FIG. 11, the edit screen 308 includes editable lock fields 309a-h. Each editable lock field 309a-h displays a current setting value and can be changed by the user. For instance, selecting field 309a causes a drop down calendar to be displayed through which the control application can receive a user's date selection. The other lock fields 309b-h are similarly updateable through user selection and/or direct text entry. As shown on the edit screen 308, the user specifies a period of time (e.g., three hours or 30 days), and/or an end (e.g., disable) date (e.g., Jun. 15, 2015), such that when the period of time has expired or the specified end date has passed based on the date/time indicated by the RTC 260, the power tool 104 locks out and becomes disabled (i.e., the power tool 104 is rendered inoperable even if a new battery pack 215 is attached). When the user enables the security feature and enters the edit screen 308, the user indicates a period of time or a disable time. As shown in FIG. 11, the user can select whether to edit the "lock-out time" or the "remaining time." In the illustrated embodiment, when the user changes one of the lock-out time or the remaining time, the other option automatically updates to correspond to the same lock-out time. For example, if the user enters a new lock-out time (e.g., Jun. 15, 2015 at 5:30 P.M.), the control application automatically updates the remaining time. In the illustrated embodiment, the current time is Jun. 13, 2015 1:58 P.M. and, thus, the remaining time shows two days, three hours, and 32 minutes.

A user can alternatively specify a period of time instead of a specific disable time, by adjusting the remaining time options. Being able to change the units of the time period also allows a user to have more flexibility in scheduling. The control application then calculates the disable date based on the current date and the user specified period of time. In the illustrated example, the user can identify the remaining time to be two days, three hours, and 32 minutes. The control application then calculates that the disable time would be Jun. 15, 2015 at 5:30 P.M., and updates the displayed lock out time in lock fields 309a and 309b accordingly. Although the remaining time options in the illustrated embodiment only include days, hours, and minutes, the units for each digit may be changed. For example, the user may change the first label from days to weeks. In such an instance, the lock-out time would be later than Jun. 15, 2015.

Returning to FIG. 7, once the user has made the desired changes to the scheduled lock settings, the control application receives and saves the updated settings (at block 316). The external device 108 then communicates with the power tool 104 to forward the updated settings for the scheduled lock and/or for the direct lock (at block 320). In particular, the external device 108 communicates to the power tool 104 whether the power tool 104 is to change from the lock state to the unlock state, from the unlock state to the lock state, and/or whether a scheduled lock has been established for the power tool 104 along with the scheduled lock settings.

When the wireless communication controller 250 receives data indicating that the user enabled the security feature and the specified disable date, the wireless communication controller 250 (e.g., the processor 258) forwards the information to the controller 226 as previously described with respect to other tool data. The controller 226 updates stored data to indicate that the security feature has been enabled and the indicated current state and the disable date (e.g., lock-out time). The controller 226 compares the current day/time from the RTC 260 to the disable data periodically or upon each trigger pull. Once the controller 226 determines that the disable date has been reached, the controller 226 ceases to drive the motor 214. The power tool 104 remains enabled when the security feature is disabled. Therefore, wireless communication between the power tool 104 and the external device 108 enables tool owners to limit tool usage based on a time. In other embodiments, the security features may disable the power tool 104 based on other parameters such as, for example, number of trigger pulls, number of completed tasks, number of power on/off switches, and the like. For example, the security control screen 282 includes additional fields to receive user input specifying these other parameters.

Additionally, in some embodiments, the power tool 104 may shut down permanently when it has not communicated with an external device 108 for a predetermined period of time or after a predetermined number of unsuccessful attempts to communicate with an external device 108. For example, in such embodiments, the external device 108 may provide an acknowledgement message to the power tool 104 to indicate that the external device 108 received a message (e.g., an identification signal, an advertisement message, or the like) from the power tool 104. When the power tool 104 does not receive such an acknowledgement message from the external device 108 after a predetermined period of time or after a predetermined number of unsuccessful attempts, the wireless communication controller 250 may control the power tool 104 to enter the locked state (i.e., disable operation of the motor 214). The power tool 104 may remain permanently locked or semi-permanently locked. To exit a semi-permanent lock sate, the power tool 104 may need to be returned to an authorized dealer or the manufacturer for unlocking (e.g., via providing to the power tool 104 a particular authorization code recognizable by the controller 226). In some embodiments, the power tool 104 exits the semi-permanent lock state upon establishing a communication link with the external device 108.

In the illustrated embodiment, the security feature is disabled by default (e.g., from the factory) and is then enabled by the user at a later time. When no power source is available (i.e., the battery pack 215 and the backup power source 252 are disconnected from the power tool 104 or are depleted), the RTC 260 cannot keep time. Therefore, the RTC time is not incremented and the period of time specified by the user will be extended because the tool 104 will require a longer time period to reach the disable time. To operate the power tool 104 again, the battery pack 215 must be connected to the power tool 104. When a charged battery pack 215 is connected to the power tool 104, the RTC 260 increments time again, the disable time is reached, and the power tool 104 is disabled. Therefore, even if the backup power source 252 is depleted, the security feature is not disabled. Accordingly, the power tool 104 provides a way to manage and limit the use of the power tool 104 and provides a level of tool lock-out and security that can be enabled by the tool owner to decrease or deter theft of power tools.

The backup power source 252 (e.g., a coin cell battery, another type of battery cell, a capacitor, or another energy storage device) includes an independent assembly within the power tool 104 that includes its own unique printed circuit board (PCB) 323 (see FIGS. 12A-E). The backup power source 252 provides power to the wireless communication controller 250 to enable the wireless communication controller 250 to operate in the advertisement state. The backup power source 252 also provides power to the RTC 260 to enable continuous tracking of time. The backup power source 252 does not provide power to energize the motor 214, drive the drive device 210, or power the controller 226, and generally only powers the wireless communication controller 250 and the RTC 260 (e.g., in embodiments in which the RTC 260 is separate from the wireless communication controller 250) when the battery pack 215 is not attached to the power tool 104. In other embodiments, the backup power source 252 also provides power to low-power elements such as, for example, LEDs, and the like. In some embodiments, the wireless communication controller 250 includes a voltage sensor 265 (see FIG. 6B) coupled to the backup power source 252. The wireless communication controller 250 uses the voltage sensor 265 to determine the state of charge of the backup power source 252. The wireless communication controller 250 may include the state of charge of the backup power source 252 in the advertisement message to the external device 108. The user can then be alerted when the state of charge of the backup power source 252 is low. In other embodiments, the wireless communication controller 250 only includes the state of charge of the backup power source 252 in the advertisement message when the state-of charge is below a low power threshold. Accordingly, the user can be alerted to charge or replace the backup power source 252.

As shown in FIGS. 12A-D, the backup power source 252 includes a coin cell battery 324 located on the PCB 323. The coin cell battery 324 is merely exemplary. In some embodiments, the backup power source 252 may be another type of battery cell, a capacitor, or another energy storage device. The coin cell battery 324 is positioned proximate (e.g., near) the wireless communication controller 250 to minimize wiring within the power tool 104. The coin cell battery 324 provides sufficient power to allow the wireless communication controller 250 to operate in the advertisement state and broadcast minimal identification information. In the illustrated embodiment, the coin cell battery 324 can run for several years by allowing the power tool 104 to only "broadcast" or "advertise" once every few seconds when operating the advertisement state.

In the illustrated embodiment, the coin cell battery 324 is a primary (i.e., non-rechargeable) backup battery. In other embodiments, the backup power source 252 includes a secondary (rechargeable) backup battery cell or a capacitor. In such embodiments, the battery pack 215 provides charging power to recharge the secondary backup battery cell or the capacitor. For example, the power input unit 224 may include charging circuitry to charge the backup power source 252. The rechargeable cell and capacitor may be sized to provide power for several days or weeks before needing to recharge.

Figure 12E:
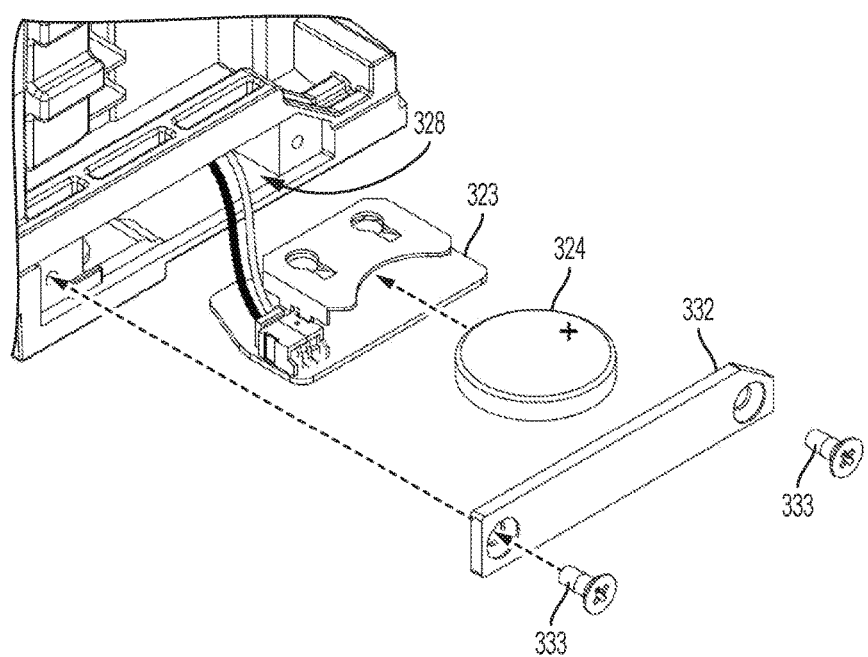

The backup power source 252 is inserted as a separate assembly inside the handle 204 of the power tool 104. As shown in FIGS. 12A-E, the battery pack receiving portion 206 also includes a coin cell slot 328. The coin cell slot 328 is positioned adjacent the connecting structure that receives the battery pack 215 and is a separate compartment of the tool housing. The foot of the power tool 104 (i.e., the battery pack receiving portion 206) defines a foot print perimeter of the power tool 104. The perimeter is defined by the edges A, B, C, D (see FIG. 5) of the battery pack receiving portion 206. As shown more clearly on FIG. 5, the coin cell slot 328 is positioned on a lateral side (i.e., side B or D) of the battery pack receiving portion 206. As shown in FIG. 5 and FIG. 12E, the backup power source 252 is secured in place by a removable plastic cover 332. The removable plastic cover 332 is attached to the power tool housing by two screws 333. The screws can be removed when replacement of the battery is needed (e.g., when the voltage of the coin cell battery 324 depletes). In some embodiments, the coin cell slot 328 is accessible via a sliding or hinged door.

Figure 13:
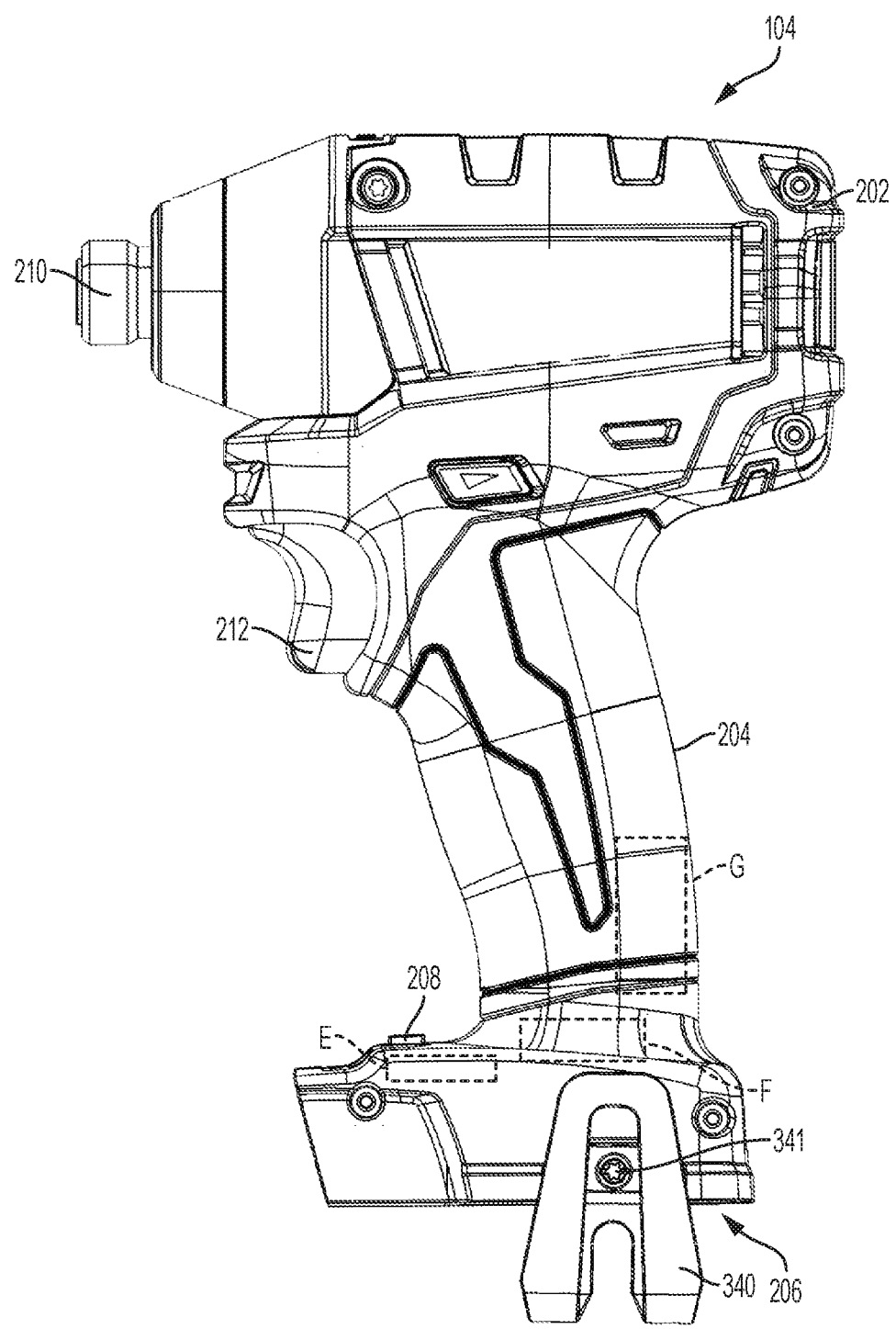
FIG. 13 illustrates a schematic diagram of alternative locations for the backup power source.

Although in the illustrated embodiment, the coin cell slot 328 is positioned within the battery pack receiving portion 206, in other embodiments, the coin cell slot 328 is positioned elsewhere on the power tool 104. For example, FIG. 13 schematically illustrates various other positions E, F, G for the coin cell slot 328. For example, position E shows the coin cell slot 328 being positioned below the selection switch 208 at the foot of the power tool 104. Position F shows the coin cell slot 328 at or near a location where the handle 204 and the foot of the power tool 104 meet. Position G shows the coin cell slot 328 in the handle 204, and, in particular, in a bottom portion of the housing of the handle 204.

Positioning the coin cell slot 328 in the battery pack receiving portion 206 has several advantages. For example, because the coin cell slot 328 is positioned in the battery pack receiving portion 206, the battery pack 215 is removed before the coin cell battery 324 is replaced, thereby ensuring that the power tool 104 is not in operation while the coin cell battery 324 is replaced. Additionally, including the coin cell slot 328 in the battery pack receiving portion 206 avoids having the slot 328 straddle the interface of the power tool's right and left clam shell housing portion, which could weaken the structural integrity of the housing. Furthermore, by positioning the coin cell slot 328 in the battery pack receiving portion 206, the manufacturing of the housing remains mostly the same. In other words, since the position of the coin cell slot 328 is within an already existing portion of the housing, most of the portions manufactured to make the housing can remain the same and a limited number of changes to the housing design have to be made. For example, as shown more clearly in FIGS. 12B-C, both sides of the housing have the same profile. By placing the coin cell battery 324 in the battery pack receiving portion 206, the coin cell battery 324 utilizes space not previously utilized, keeping the power tool 104 compact and efficient.

The position of the coin cell battery 324 also does not interfere with any of the foot accessories of the power tool 104. For example, on the same side of the foot that houses the coin cell slot 328, a belt hook mount 336 is provided having three recesses 338a, 338b, and 338c (FIG. 12D) for attachment of a belt hook 340 (see FIG. 13). Additionally, a lanyard is attachable to the belt hook mount 336. In the illustrated embodiment, the power tool 104 includes the belt hook mount 336 on both lateral sides, including the lateral side having the coin cell slot 328, yet the coin cell slot 328 does not interfere with the attachment of the belt hook 340. Each of the belt hook mounts 336 is a protrusion from one of the lateral sides of the power tool 104. The belt hook 340 including an attachment end with a throughole 341 and two bosses not shown. The throughole 341 aligns with the (threaded) recess 338a, which includes a threaded insert, and the each of the bosses aligns with one of the (alignment) recesses 338b and 338c. To secure the belt hook 340 to the belt hook mount 336, a screw is inserted through the throughole 341 and into the threaded recess 338a where the screw is rotated to fasten the belt hook 340. The recesses 338a, 338b, and 338c of the belt hook mount 336 stop short of, and do not extend into the, the coin cell slot 328.

In some embodiments, the wireless communication controller 250 resides with the backup power source 252 in the coin cell slot 328. For example, the PCB 323 may include both terminals for receipt of a power source, such as coin cell battery 324, and the wireless communication controller 250. In such embodiments, the communication channel 262 may be in the form of a selectively connectable ribbon cable or other connector that couples the PCB 323 (and the components thereon) with the controller 226. Accordingly, the PCB 323, including the backup power source 252 and the wireless communication controller 250, may be part of a modular unit that is selectively inserted into (or removed from) the power tool 104 to selectively provide wireless communication capabilities for the power tool 104. In such embodiments, the wireless communication controller 250 may be coupled to the power input 224, as shown in FIG. 6A, through the same ribbon cable that provides the communication channel 262. Accordingly, the wireless communication controller 250 may be powered by a battery pack coupled to the battery pack interface 222, if present, or the backup power source 252. A switch on the PCB 323 may be controlled to select between power sources based on the presence or absence of power available from the power input 224.

Figure 14:
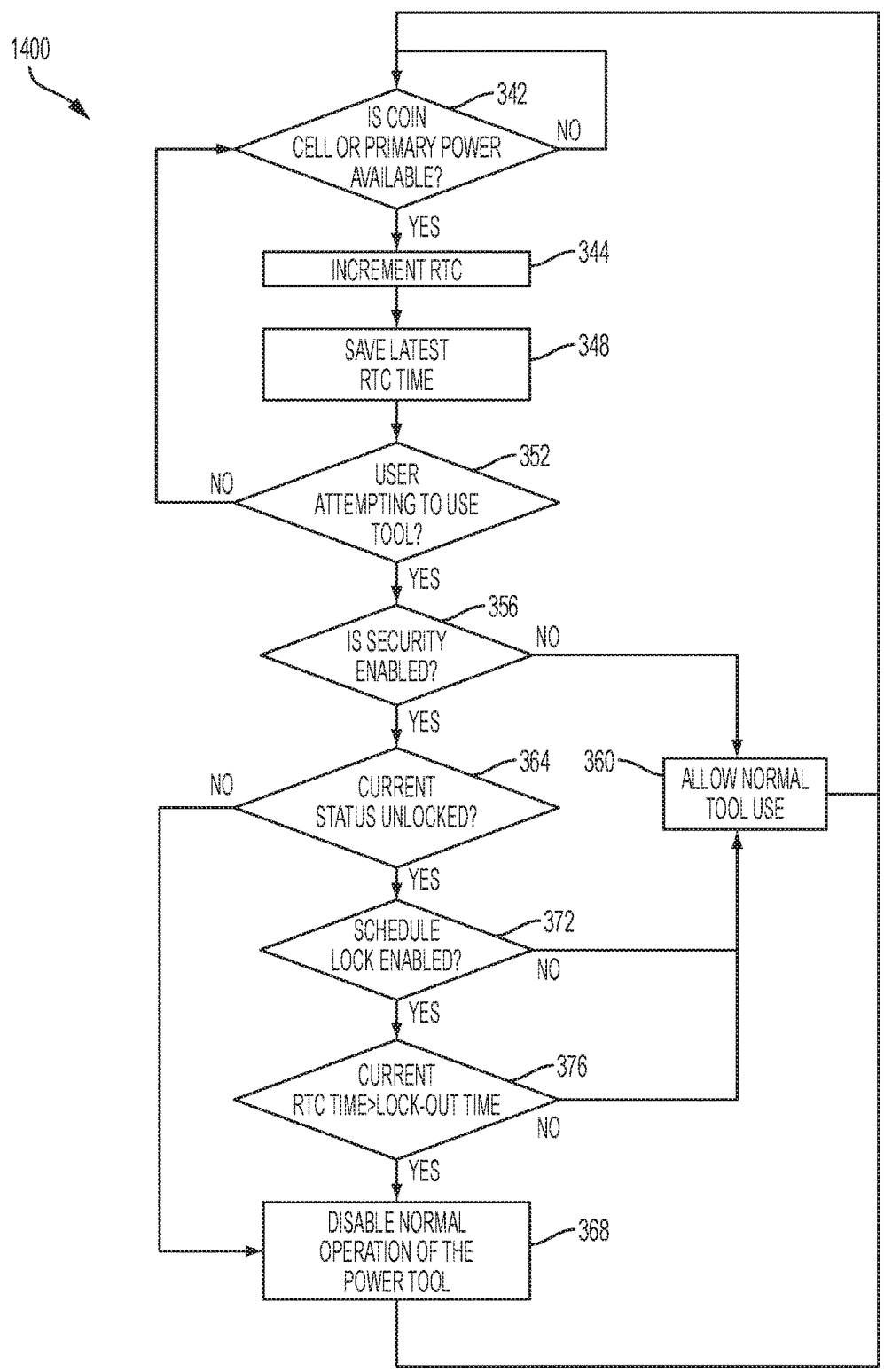
FIG. 14 illustrates a method of operating the power tool.

FIG. 14 illustrates a method 1400 of general operation of the power tool 104. First, the power tool 104 (e.g., controller 226 or 250) determines whether there is a power source present (at block 342). If there is a power source present (e.g., the battery pack 215 is connected to the power tool 104 or the backup power source 252 is available), the RTC 260 increments time (at block 344) and saves the latest RTC time (at block 348) in case the power source becomes disconnected and/or depleted. Stated another way, at block 348, the controller 226 obtains the RTC time. The controller 226 then determines whether the user is attempting to operate the power tool 104 (at block 352). For example, the controller 226 may monitor the trigger switch 213 to determine whether the user is attempting to operate the power tool 104.

If the user is not attempting to use the power tool 104, the power tool 104 remains idle and the method 1400 proceeds back to block 342. However, if the user is attempting to utilize the power tool 104, the controller 226 then determines whether the security feature is enabled (at block 356). If the security feature is not enabled, the power tool 104 operates normally (at block 360). From block 360, the method 1400 may proceed back to block 342 to repeat the method 1400. At block 356, if the security feature is enabled, the controller 226 determines whether the current status of the power tool 104 is set to "unlock" (at block 364). If the current status of the power tool 104 is not set to "unlock" (e.g., the status is set to "lock"), the power tool 104 remains idle and the controller 226 disables normal operation of the power tool 104 (at block 368). From block 368, the method 1400 may proceed back to block 342 to repeat the method 1400.

At block 364, if the current status of the power tool 104 is set to "unlock," the controller 226 then determines whether the scheduled lock is enabled (at block 372). If the scheduled lock is disabled, the power tool 104 operates normally (at block 360). If the scheduled lock is enabled, the controller 226 determines whether the current RTC time exceeds the disable time (at block 376). If the current RTC time has not exceeded the disable time (i.e., the lock-out time), the power tool 104 operates normally (at block 360). On the other hand, if the RTC time meets or exceeds the disable time, the power tool 104 is becomes idle and the controller 226 disables normal operation of the power tool 104 (at block 368). The power tool 104 remains disabled until the security feature is disabled or the disable time is updated to a future time on the external device 108. As indicated in FIG. 14, from both of blocks 360 and 368, the method 1400 may proceed back to block 342 to repeat the method 1400. Repetition of the method 1400 allows the power tool 104 to receive updated security features from the external device 108 that allow the power tool 104 to adjust its security settings and operation settings.

In some embodiments, blocks 342 and 344 occur independently (i.e., separate from) the method 1400. In some embodiments, the method 1400 further includes a block of obtaining security settings (e.g., in advance of obtaining the RTC time in block 348). Obtaining security settings may occur through receipt, by the controller 226, of security settings from the external device 108 as provided in blocks 303 and 320 of FIG. 7.

Figure 15:
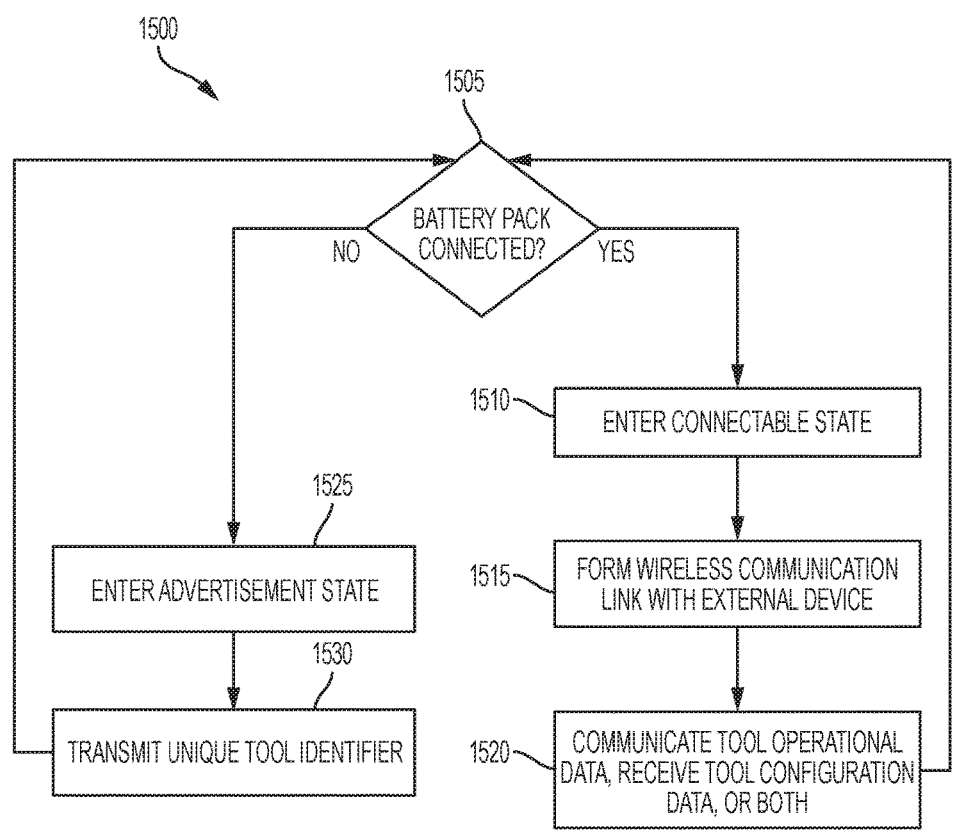
FIG. 15 illustrates a method of wirelessly communicating by the power tool

FIG. 15 illustrates a method 1500 of wirelessly communicating by a power tool, such as the power tool 104. In block 1505, the wireless communication controller 250 determines whether the battery pack interface 222 is connected to a battery pack, such as the battery pack 104b (FIG. 1). For example, the processor 258 of the wireless communication controller 250 (FIG. 6B) may monitor an input pin coupled to the power input unit 224 (FIG. 6A) to determine whether power is being received from the power input unit 224. Returning to FIG. 15, when the wireless communication controller 250 determines that a battery pack is coupled to the battery pack interface 222, the wireless communication controller enters the connectable state (block 1510). In block 1515, the wireless communication controller 250 forms a wireless communication link with the external device 108. As noted above, the wireless communication link may be the Bluetooth® link or another wireless protocol link. The communication link may be particularly formed between the processor 258 of the wireless communication controller 250 and the processor 114 of the external device 108 via the antenna and transceiver 254 and the short-range transceiver 118. In block 1520, the wireless communication controller 250 communicates, over the wireless communication link, to one or more of transmit tool operational data and receive tool configuration data from the external device 108. For example, in some instances, the wireless communication controller 250 transmits tool operational data, such as tool usage data, maintenance data, mode information, drive device information, and the like from the power tool 104. Further, in some instances, the wireless communication controller 250 receives tool configuration data, such as operation thresholds (e.g., speed and torque levels), maintenance thresholds, mode configurations, programming for the power tool 104, feature information, and the like.

After communicating in block 1520, the wireless communication controller 250 returns to block 1505 to determine whether a battery pack is connected to the battery pack interface 222. When the wireless communication controller 250 determines that no battery pack is connected to the battery pack interface 222 (e.g., the previously connected battery pack has been disconnected from the battery pack interface 222), the wireless communication controller 250 proceeds to enter the advertisement state (block 1525). In the advertisement state, the wireless communication controller 250 receives power from and is powered by the backup power source 252. In block 1530, the wireless communication controller 250 transmits an advertisement message including a unique tool identifier. For example, the wireless communication controller 250 may periodically broadcast identification information when in the advertisement state. In some embodiments, the wireless communication controller 250 may respond to requests (e.g., pings) for identification information. In some embodiments, the advertisement message includes additional information, such as a charge level of the backup power source 252.

In some embodiments, the method 1500 further includes detecting activation of an actuator, such as by the controller 226 detecting depression of the trigger 212. In response, in the connectable state, the controller 226 controls the switching network 216 to apply power from the battery pack coupled to the battery pack interface 222 to drive the motor 214 based on the actuator activation.

In some embodiments, the method 1500 further includes the controller 226 obtaining tool usage data from one or more of the sensors 218 while in the connectable state. Further, the wireless communication controller 250 receives the tool usage data from a memory of the power tool (e.g., over the communication channel 262). The wireless communication controller 250 transmits the tool usage data to the external device as part of the tool operational data.

In some embodiments, the method 1500 further includes the controller 226, while in the connectable state, storing tool configuration data received from the external device 108 to the memory 232 (e.g., over the communication channel 262). Further, the controller 226 controlling drives the motor 214 of the power tool based on the tool configuration data. For example, the controller 226 may drive the motor 214 at a speed specified in the tool configuration data, or until a torque level specified in the configuration data is reached.

In some embodiments, the controller 226 drives the motor 214 when the wireless communication controller 250 is in the connectable state; but the controller 226 is maintained unpowered when the wireless communication controller 250 is in the advertisement state. For example, as noted, in the advertisement state, the battery pack interface 222 is not connected to a battery pack. Accordingly, the controller 226 does not receive power from the battery pack interface 222 or power input unit 224. Further, the backup power source 252 is not coupled to the controller 226 and does not provide power to the controller 226 in the advertisement state. Accordingly, the controller 226 remains unpowered when the wireless communication controller 250 is in the advertisement state.

In some embodiments, the method 1500 further includes the coin cell slot 328 (a backup battery receptacle of the power tool) receiving the backup power source 252. Further, a battery pack, when connected to the battery pack interface 222, blocks the coin cell slot 328 and, when disconnected, provides access to the coin cell slot 328. For example, as shown in FIG. 5, the coin cell slot 328 is located in the battery pack receiving portion 206. When a battery pack (e.g., the battery pack 104b) is coupled to the battery pack receiving portion 206 (and, thereby, the battery pack interface 222), the coin cell slot 328 is inaccessible. However, when the battery pack is disconnected from the battery pack receiving portion 206, the coin cell slot 328 is again In some embodiments, the method 1500 further includes powering the wireless communication controller 250 with power from the backup power source 252 in the advertisement state; and powering the wireless communication controller with power from the backup pack in the connectable state.

In some embodiments, the method 1500, or a method of displaying a communication state of a power tool, includes receiving, by the external device 108, data transmitted by the wireless communication controller 250. The received data may be that which is transmitted in block 1520 and block 1530 (e.g., one or more of unique tool identifier, an advertisement message, and operational data). The external device 108 determines a communication state of the wireless communication controller. For example, the external device 108 determines whether the wireless communication controller 250 is in the advertisement state or the connectable state. The determination may be made based on, for example, a format of the data received from the wireless communication controller 250 or based on state information explicitly included within the data received. Upon determining the state of the wireless communication controller 250, the external device 108 displays an indication of the determined state along with an identity of the power tool, which also may be determined based on the received data (e.g., based on a received unique tool identifier). For example, with reference to FIG. 8, the external device 108 may display an indication of the tool identity based on the received data (e.g., based on a unique tool identifier) along with a wireless symbol in a first style that is grayed out or lighter when in the advertisement state and in a second style that is darker or bolder when in the connectable state.

Although the flow charts of FIGS. 7, 14, and 15 are illustrated and described as blocks performed in a serial manner, one or more blocks of the methods 700, 1400, and 1500 may be executed in parallel or in a different order than described.

In some embodiments, the wireless communication controller 250 remains in the connectable state even after removal of a battery pack from the battery pack interface 222. For example, the backup power source 252 may power the wireless communication controller 250 and the controller 226, enabling both retrieval of tool operational data from the memory 232 for export to the external device 108 and updating of tool configuration data residing in the memory 232 based on data received from the external device 108. When the wireless communication controller 250 is in a connectable state and is powered by the backup power source 252, and a battery pack is not coupled to the battery pack interface 222, the power tool 104 may be referred to as being in a low-power connectable state. In the low-power connectable state, the power tool 104 is operable to communicate with the external device 104, as is usual in the connectable state, but the motor 214 is in a non-drivable state because the power source for the motor 214 has been removed (i.e., insufficient power is available for supply to the switching network 216). The low-power connectable state may also be referred to as a non-driving connectable state, as the motor 214 is not driven, yet full communication capabilities are present (i.e., the communications are not limited or restricted as in the advertisement state). In these embodiments, when a battery pack is coupled to the battery pack interface 222, the power tool 104 enters the previously described, full-power connectable state, such as described with respect to blocks 1510, 1515, and 1520 in FIG. 15. This connectable state may also referred to as a driving connectable state because the motor 214 may be driven and full communication capabilities are present.

Thus, the invention provides, among other things, a power tool that can identify itself to an external device even when a battery pack is not attached to the power tool, and a power tool that can enable a time-based security feature. Various features and advantages of the invention are set forth in the following claims.

What is claimed is:

1. A power tool having multiple wireless communication states, the power tool comprising:
   a motor;
   a battery pack interface that selectively receives a battery pack;
   a backup power source;
   a wireless communication controller coupled to the backup power source and the battery pack interface, the wireless communication controller including a wireless transceiver, a processor, and a unique tool identifier, the wireless communication controller configured to operate in an advertisement state when the wireless communication controller is coupled to and powered by the backup power source, wherein, in the advertisement state, the wireless communication controller is configured to transmit an advertisement message including the unique tool identifier;
   a switching network coupled between the motor and the battery pack interface;
   an actuator;
   a controller coupled to the actuator and the switching network, the controller configured to control the switching network to apply power from the battery pack to drive the motor based on actuator activation, wherein the controller is unpowered when the wireless communication controller is in the advertisement state and the battery pack is disconnected from the battery pack interface.

2. The power tool of claim 1, wherein the wireless communication controller is further configured to operate in a connectable state when the wireless communication controller is coupled to and powered by the battery pack, wherein, in the connectable state, the wireless communication controller is configured to form a wireless communication link with an external device and to one or more of transmit tool operational data to the external device and receive tool configuration data from the external device.

3. The power tool of claim 2, further comprising a communication channel coupling the controller to the wireless communication controller, wherein the controller further includes a memory storing the tool operational data obtained by a processing unit of the controller, and the wireless communication controller is further configured to, in the connectable state, obtain the tool operational data from the controller over the communication channel and transmit the tool operational data to the external device.

4. The power tool of claim 2, further comprising a communication channel coupling the controller to the wireless communication controller, the wireless communication controller is further configured to, in the connectable state, obtain the tool configuration data from the external device and to provide the tool configuration data to the controller over the communication channel.

5. The power tool of claim 4, wherein the controller further includes a memory storing the tool configuration data and a processing unit that controls the switching network to apply power from the battery pack to drive the motor based on the tool configuration data.

6. The power tool of claim 2, further comprising a real-time clock coupled to the backup power source and configured to maintain a current time;
   wherein the controller is further configured to receive a lock out time from the external device via the wireless communication controller and to receive the current time, and further configured to lock the power tool upon determining that the current time exceeds the lock out time.

7. The power tool of claim 1, further comprising a housing that houses the motor and the wireless communication controller, the housing including a backup battery receptacle for receipt of the backup power source.

8. The power tool of claim 7, wherein the backup battery receptacle is inaccessible when the battery pack is connected to the battery pack interface and accessible when the battery pack is disconnected from the battery pack interface.

9. The power tool of claim 7, wherein the backup battery receptacle and the battery pack interface are located on a foot of the housing.

10. The power tool of claim 1, wherein transmitting of the advertisement message in the advertisement state includes periodic broadcasting of the advertisement message, and wherein the advertisement message further includes a charge level of the backup power source.

11. A method of wirelessly communicating by a power tool, the method comprising:
   determining, by a wireless communication controller, that a battery pack interface is disconnected from a battery pack;
   entering, by the wireless communication controller, an advertisement state for wireless communication based on determining that the battery pack interface is disconnected from the battery pack; and transmitting, by the wireless communication controller, an advertisement message including a unique tool identifier of the power tool when in the advertisement state.

12. The method of claim 11, further comprising:
determining, by the wireless communication controller of the power tool, that the battery pack interface is connected to the battery pack;
forming a wireless communication link with an external device; and
communicating, over the wireless communication link, to one or more of transmit tool operational data and receive tool configuration data from the external device.

13. The method of claim 12, wherein entering the advertisement state includes receiving, by the wireless communication controller, power from a backup power source.

14. The method of claim 13, wherein transmitting, by the wireless communication controller, the advertisement message further includes periodic broadcasting of the advertisement message, and wherein the advertisement message further includes a charge level of the backup power source.

15. The method of claim 13, further comprising:
receiving, by a real-time clock, power from the backup power source;
maintaining, by the real-time clock, a current time;
receiving a lock out time, from an external device via the wireless communication controller; and
locking the power tool upon determining that the current time exceeds the lock out time.

16. The method of claim 12, further comprising
receiving, by a backup battery receptacle of the power tool, a backup power source;
blocking, by the battery pack, the backup battery receptacle when the battery pack is connected to the battery pack interface; and
providing access to the backup battery receptacle when the battery pack is disconnected from the battery pack interface.

17. A method of wirelessly communicating by a power tool, the method comprising:
detecting activation of an actuator;
controlling, by a controller, a switching network of the power tool to apply power from a battery pack to drive a motor of the power tool based on the activation of the actuator;
determining, by a wireless communication controller, that a battery pack interface is disconnected from the battery pack;

entering, by the wireless communication controller, an advertisement state for wireless communication based on determining that the battery pack interface is disconnected from the battery pack;
transmitting, by the wireless communication controller, an advertisement message including a unique tool identifier of the power tool when in the advertisement state; and
maintaining the controller in an unpowered state when the wireless communication controller is in the advertisement state.

18. The method of claim 17, further comprising
determining, by the wireless communication controller, that the battery pack interface is connected to the battery pack;
entering, by the wireless communication controller, a connectable state for wireless communication based on determining that the battery pack interface is connected to the battery pack;
forming a wireless communication link with an external device in the connectable state; and
communicating, over the wireless communication link, to one or more of transmit tool operational data and receive tool configuration data from the external device.

19. The method of claim 18, further comprising, in the connectable state,
storing the tool configuration data received from the external device to a memory of the power tool; and
controlling driving the motor of the power tool based on the tool configuration data.

20. The method of claim 18, further comprising:
powering the wireless communication controller with power from a backup power source in the advertisement state; and
powering the wireless communication controller with power from the battery pack in the connectable state.

21. The method of claim 18, further comprising:
determining, by the external device, a communication state of the wireless communication controller, the communication state being one selected from the group consisting of the connectable state and the advertisement state;
displaying, by the external device, an identity of the power tool and the communication state.

* * * * *